United States Patent
Maeno et al.

(10) Patent No.: US 9,902,273 B2
(45) Date of Patent: Feb. 27, 2018

(54) POWER GENERATION AMOUNT OUTPUT DEVICE AND SOLAR POWER GENERATION SYSTEM

(71) Applicants: Seigen Maeno, Toyota (JP); Takuya Hibino, Kobe (JP)

(72) Inventors: Seigen Maeno, Toyota (JP); Takuya Hibino, Kobe (JP)

(73) Assignees: TOYOTA JIDOSHA KABUSHIKI KAISHA, Toyota-shi, Aichi (JP); DENSO TEN LIMITED, Hyogo-ku, Kobe-shi (JP)

( * ) Notice: Subject to any disclaimer, the term of this patent is extended or adjusted under 35 U.S.C. 154(b) by 182 days.

(21) Appl. No.: 14/777,648

(22) PCT Filed: Apr. 17, 2014

(86) PCT No.: PCT/JP2014/060965
§ 371 (c)(1),
(2) Date: Sep. 16, 2015

(87) PCT Pub. No.: WO2014/178291
PCT Pub. Date: Nov. 6, 2014

(65) Prior Publication Data
US 2016/0272069 A1   Sep. 22, 2016

(30) Foreign Application Priority Data
Apr. 30, 2013   (JP) .................................. 2013-095948

(51) Int. Cl.
*B60L 8/00* (2006.01)
*B60K 35/00* (2006.01)
(Continued)

(52) U.S. Cl.
CPC .............. *B60L 8/003* (2013.01); *B60K 35/00* (2013.01); *B60L 3/00* (2013.01); *B60L 7/12* (2013.01);
(Continued)

(58) Field of Classification Search
CPC combination set(s) only.
See application file for complete search history.

(56) References Cited

U.S. PATENT DOCUMENTS

2012/0083927 A1* 4/2012 Nakamura ........... G05B 13/026
                                                            700/278
2013/0265030 A1* 10/2013 Kuroda ................... H02J 3/386
                                                            323/318
(Continued)

FOREIGN PATENT DOCUMENTS

JP      2008-178282 A   7/2008
JP      2012-080725 A   4/2012
(Continued)

OTHER PUBLICATIONS

International Search Report for PCT/JP2014/060965 dated May 13, 2014.

*Primary Examiner* — Thomas G Black
*Assistant Examiner* — Ana D Thomas
(74) *Attorney, Agent, or Firm* — Sughrue Mion, PLLC

(57) ABSTRACT

A power generation amount output device configured to output a power generation amount of a photovoltaic panel having been installed in a vehicle to a display unit, includes a power generation amount obtainment unit configured to obtain the power generation amount of the photovoltaic panel; a fluctuation reduction unit configured to reduce a fluctuation of the power generation amount to be output by the display unit, depending on a vehicle state of the vehicle; and a power generation amount output unit configured to (Continued)

output the power generation amount having the fluctuation reduced by the fluctuation reduction unit to the display unit.

9 Claims, 16 Drawing Sheets

(51) Int. Cl.
| | | |
|---|---|---|
| *B60L 7/12* | (2006.01) | |
| *B60L 11/18* | (2006.01) | |
| *B60L 3/00* | (2006.01) | |
| *B60R 16/04* | (2006.01) | |

(52) U.S. Cl.
CPC ............. *B60L 8/00* (2013.01); *B60L 11/1868* (2013.01); *B60R 16/04* (2013.01); *B60L 2210/10* (2013.01); *B60L 2240/12* (2013.01); *B60L 2240/547* (2013.01); *B60L 2240/549* (2013.01); *B60L 2240/662* (2013.01); *B60L 2240/665* (2013.01); *B60L 2250/16* (2013.01); *B60L 2250/26* (2013.01); *Y02T 10/7005* (2013.01); *Y02T 10/7066* (2013.01); *Y02T 10/7083* (2013.01); *Y02T 10/7216* (2013.01); *Y02T 10/7291* (2013.01); *Y02T 90/16* (2013.01)

(56) References Cited

U.S. PATENT DOCUMENTS

| | | | | |
|---|---|---|---|---|
| 2015/0188415 | A1* | 7/2015 | Abido | H02M 3/005 307/103 |
| 2015/0295448 | A1* | 10/2015 | Sugeno | H01M 10/4207 701/22 |

FOREIGN PATENT DOCUMENTS

| | | | | | |
|---|---|---|---|---|---|
| JP | 2014165948 | A | * | 2/2013 | ............. Y02E 10/50 |
| JP | 2016042288 | A | * | 3/2016 | ............. B60R 21/00 |

* cited by examiner

FIG.5
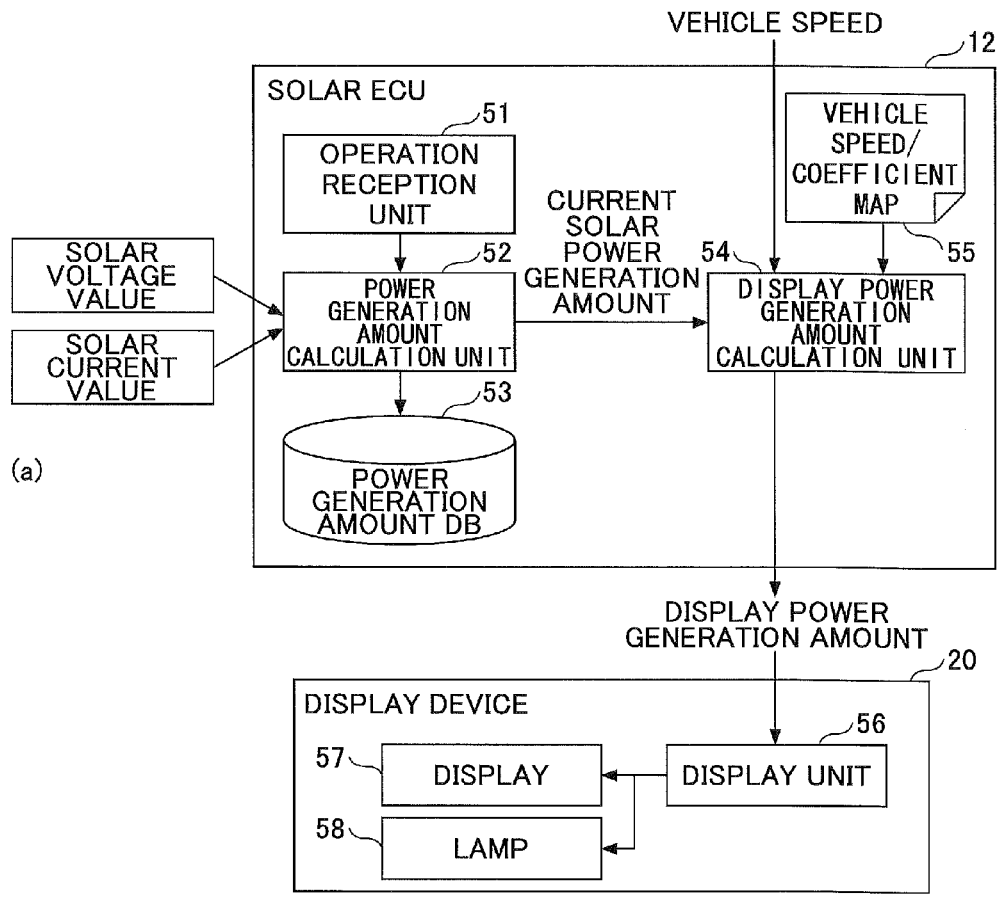
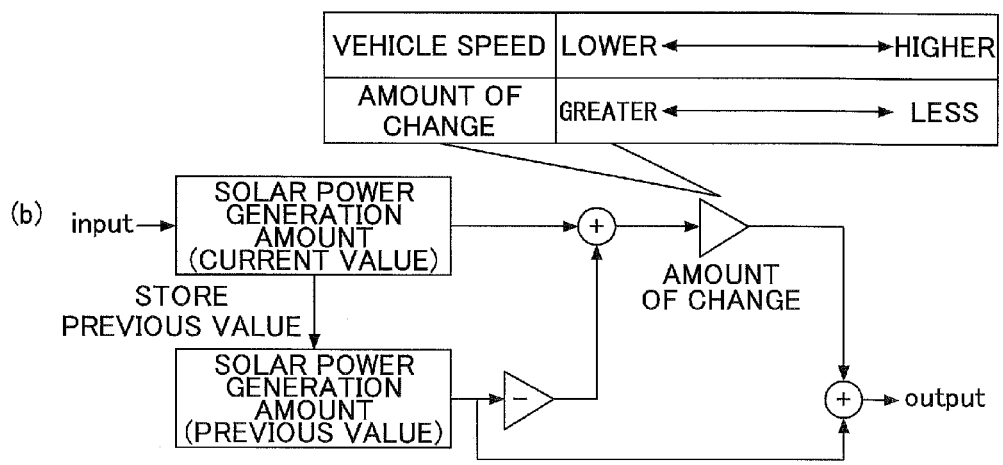

| DATE AND TIME | POSITIONAL INFORMATION (LATITUDE/LONGITUDE /ALTITUDE) | SOLAR RADIATION AMOUNT (MJ/m²) | AIR TEMPERATURE (°C) | VEHICLE SPEED (km/h) | POWER GENERATION AMOUNT (W) |
|---|---|---|---|---|---|
| 2013/XX/XX 10:00:00 | NORTH LATITUDE 35.42 EAST LONGITUDE 139.48 | 100 | 25 | 0 | 70 |
| 2013/XX/XX 10:00:01 | NORTH LATITUDE 35.42 EAST LONGITUDE 139.48 | 105 | 25 | 1 | 72 |
| 2013/XX/XX 10:00:02 | NORTH LATITUDE 35.42 EAST LONGITUDE 139.48 | 103 | 25 | 1 | 71 |

FIG.8
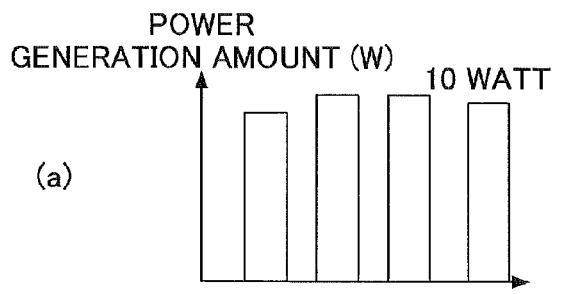
(a) POWER GENERATION AMOUNT (W) — 10 WATT / TIME
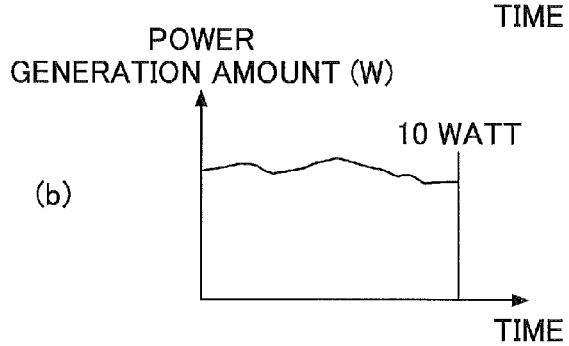
(b) POWER GENERATION AMOUNT (W) — 10 WATT / TIME
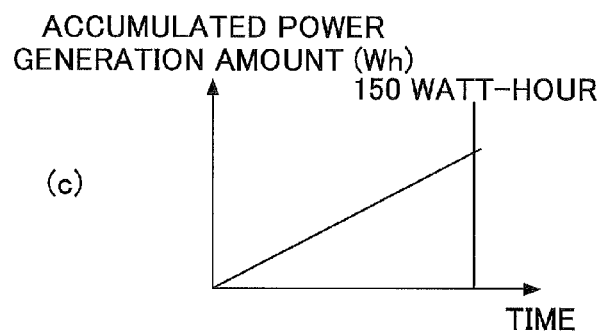
(c) ACCUMULATED POWER GENERATION AMOUNT (Wh) — 150 WATT-HOUR / TIME
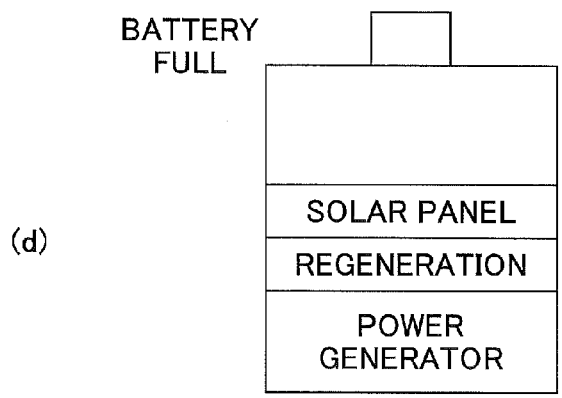
(d) BATTERY FULL — SOLAR PANEL / REGENERATION / POWER GENERATOR
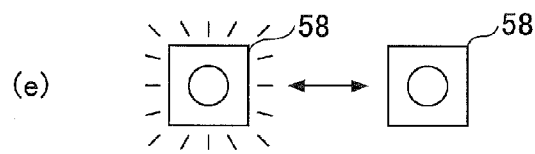
(e) 58 ↔ 58

POWER GENERATION AMOUNT OUTPUT DEVICE AND SOLAR POWER GENERATION SYSTEM

CROSS REFERENCE TO RELATED APPLICATIONS

This application is a National Stage of International Application No. PCT/JP2014/060965 filed Apr. 17, 2014, claiming priority based on Japanese Patent Application No. 2013-095948, filed Apr. 30, 2013, the contents of all of which are incorporated herein by reference in their entirety.

TECHNICAL FIELD

The disclosures herein generally relate to a power generation amount output device and the like that output a power generation amount of a photovoltaic panel installed on a vehicle to a display unit.

BACKGROUND ART

Solar batteries have become popular to suppress use of fossil fuel and to reduce environmental loading. For example, a solar battery installed on the roof of a house can be an electric power source of various electric products in the house, and can charge an electric vehicle or a plug-in hybrid vehicle. Consequently, users want to know how much power the solar battery generates, and how much of the power consumption of the house is covered by the generated power; and there are known conventional technologies that display power generation amounts on display units placed in houses (see, for example, Patent Document 1).

Incidentally, as plug-in hybrid vehicles and electric vehicles have become popular, vehicles tend to have the solar power generation systems installed. For a solar power generation system in a vehicle, passengers also want to know how much the current power generation amount is. Therefore, technologies have been under investigation that display power generation amounts on meter panels or displays.

RELATED-ART DOCUMENTS

Patent Documents

[Patent Document 1] Japanese Laid-open Patent Publication No. 2008-178282

SUMMARY OF THE INVENTION

Problem to be Solved by Invention

However, since a solar battery installed on a vehicle is placed at a lower position than a solar battery for a house, it tends to be more influenced by shades of objects on the ground (buildings, signboards, utility poles, etc.). Also, the power generation on a vehicle has a characteristic that the power generation amount changes frequently because the vehicle moves around, and the power generation is influenced by shades of unspecified objects on the ground. Therefore, a problem arises that it is not easy for a user to grasp the power generation amount, just by having the solar power generation system display a current power generation amount on a meter as is.

Thereupon, when displaying the power generation amount, one may need to consider a process with which the amount of change to be displayed can be made less fluctuating than the actual amount of change of the power generation amount. This makes the change of the displayed power generation amount fluctuate less, and a user can grasp the more stable power generation amount.

However, if the amount of change of the display amount is to be made with less fluctuation, it takes time to display a correct power generation amount at a current place, and a problem arises that it is difficult for a passenger, who is driving around and looking for a parking lot having a great power generation amount, to determine whether it is actually a parking lot having a great power generation amount (less shaded).

Thus, a solar battery installed in a vehicle has the problem that it is difficult to satisfy both needs of a passenger: one is to grasp the power generation amount stably; and the other is to determine a parking lot having a great power generation amount.

Thereupon, it is an object to provide a power generation amount output device that makes it easy to grasp the power generation amount and to identify a place having a great power generation amount.

Means to Solve the Problem

According to an aspect of the present disclosures, a power generation amount output device configured to output a power generation amount of a photovoltaic panel having been installed in a vehicle to a display unit, includes a power generation amount obtainment unit configured to obtain the power generation amount of the photovoltaic panel; a fluctuation reduction unit configured to reduce a fluctuation of the power generation amount to be output by the display unit, depending on a vehicle state of the vehicle; and a power generation amount output unit configured to output the power generation amount having the fluctuation reduced by the fluctuation reduction unit to the display unit.

Advantage of the Invention

According to the present disclosures, it is possible to obtain a power generation amount output device that makes it easy to grasp the power generation amount and to identify a place having a great power generation amount.

BRIEF DESCRIPTION OF DRAWINGS

FIG. 5 is an example of a functional block diagram of a solar ECU;

FIG. 8 is a diagram that illustrates an example of display power generation amounts that are displayed;

FIG. 10 is an example of a diagram that schematically illustrates a rate limitation and the like;

MODE FOR CARRYING OUT THE INVENTION

In the following, embodiments of the present invention will be described in detail with reference to the drawings.

Figure 1:
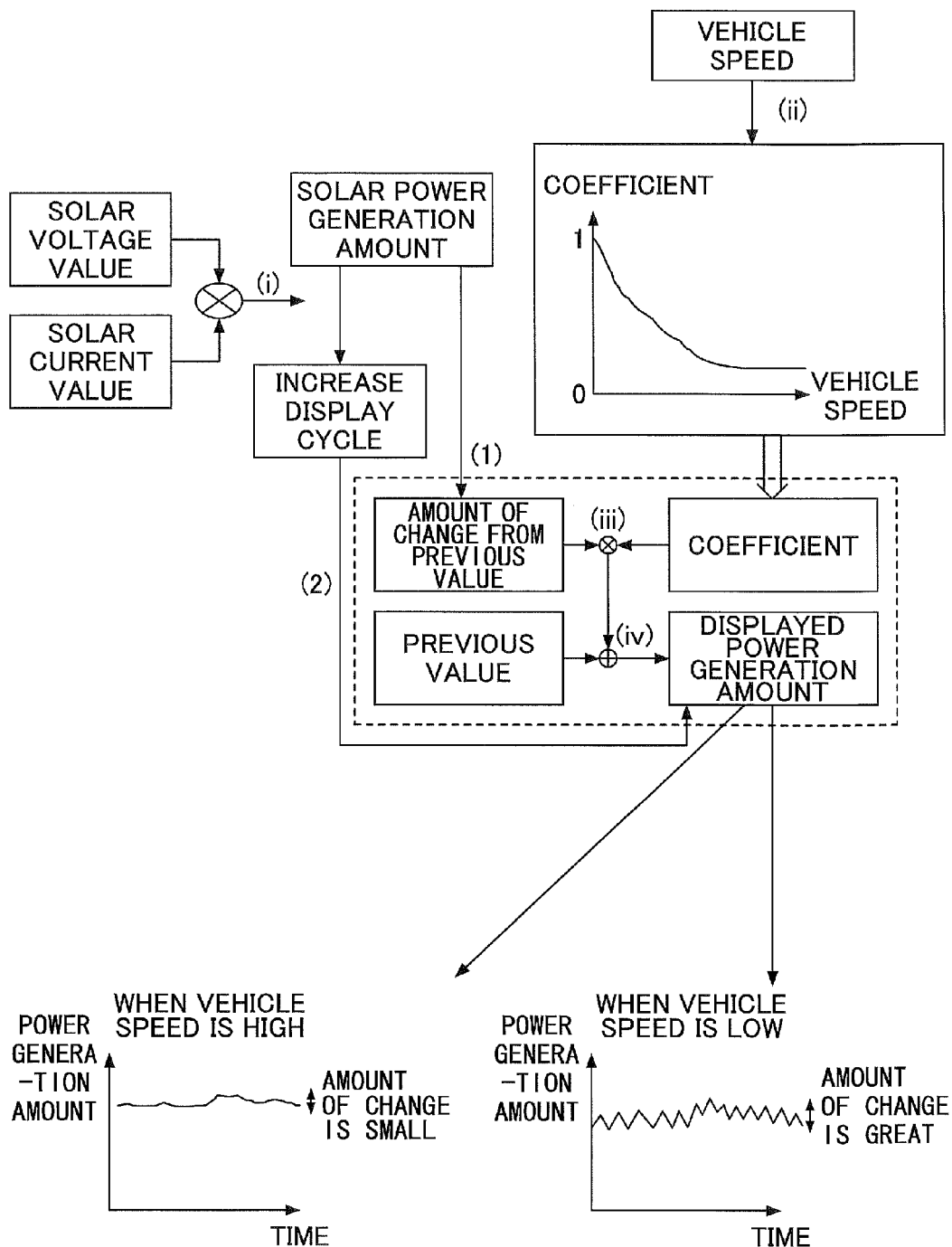
FIG. 1 is an example of a diagram that illustrates displaying a power generation amount by a solar power generation system according to an embodiment of the present invention.

FIG. 1 is an example of a diagram that illustrates displaying a power generation amount by a solar power generation system according to an embodiment of the present invention. The embodiment includes two main methods that reduce fluctuation of a displayed power generation amount (the first embodiment and the second embodiment that will be described later). In FIG. 1, they are designated by (1) and (2), respectively.

(1) Fluctuation Check Process (i) A solar power generation amount is obtained from a solar voltage value and a solar current value of power generated by a solar panel. Also, since a previous value of the solar power generation amount (simply referred to as the "power generation amount" below) is known, an amount of change from the previous value can be obtained.

(ii) The solar power generation system periodically obtains current vehicle speed. The solar power generation system includes a vehicle speed/coefficient map in which coefficients are registered with respect to the vehicle speed. The vehicle speed/coefficient map has coefficients registered where the coefficient is 1 for the vehicle speed of zero and the coefficients are smaller while the vehicle speed is higher.

(iii) The solar power generation system reads a coefficient out of the vehicle speed/coefficient map depending on the current vehicle speed, and multiplies the coefficient by the amount of change from the previous value. Therefore, the amount of change is converted into a smaller value when the vehicle speed is higher. In the following, this process will be referred to as the "fluctuation check process".

(iv) The solar power generation system adds the previous value and the converted amount of change, and displays the sum. Therefore, the power generation amount to be displayed is a value that is obtained by adding the previous power generation amount and the amount of change that has been converted into a smaller value when the vehicle speed is higher. Therefore, if the vehicle speed is low, the amount of change is reflected to the display amount as is; or if the vehicle speed is high, the change is less.

(2) Change of Display Cycle

Also, the solar power generation system reduces fluctuation of the power generation amount by changing the display cycle of the power generation amount. Methods of changing the display cycle include a method that lengthens the cycle for calculating the power generation amount, and a method that lengthens the cycle for outputting the calculated power generation amount on a display. Since the cycle becomes longer, fluctuation of the displayed power generation amount can be reduced even if the actual power generation amount fluctuates within a short time.

By these processes (1) and (2), the power generation amount is stably displayed when the vehicle speed is high, and the power generation amount having a great amount of change is displayed when the vehicle speed is low. Therefore, if the passenger is driving around and looking for a parking lot having a great power generation amount, the passenger can precisely identify a parking lot having a great power generation amount because the power generation amount changes in real time. If traveling on a road at a high vehicle speed, the passenger can easily grasp the current power generation amount because the amount of change is displayed with less fluctuation even if the power generation amount changes.

[First Embodiment]

Figure 2:
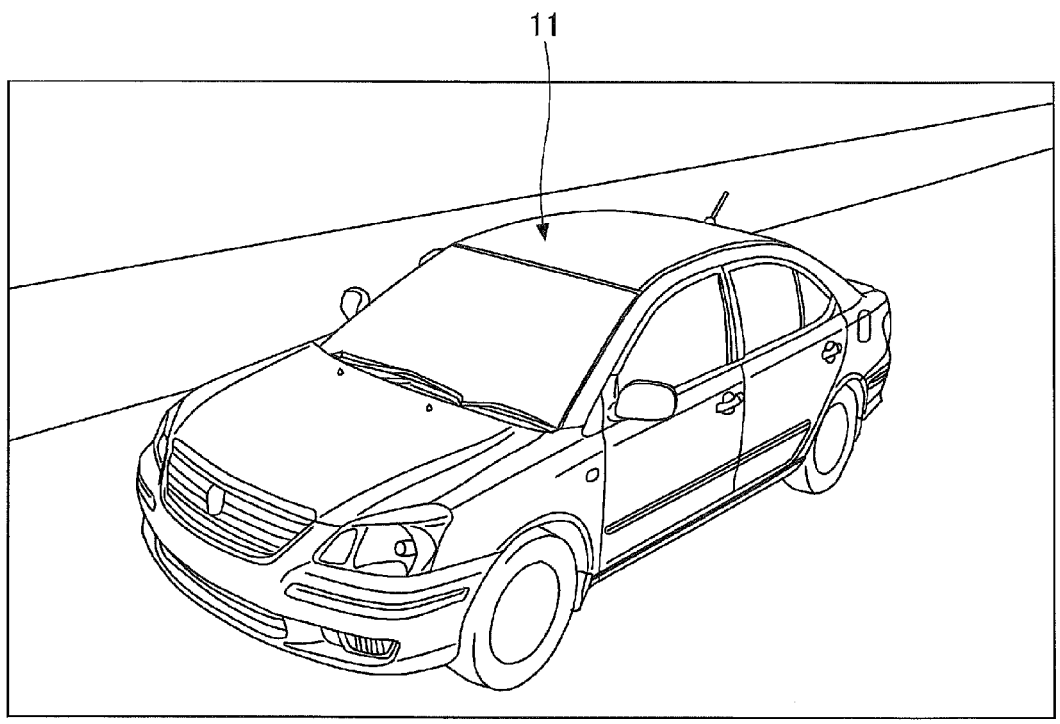
FIG. 2 is a diagram that illustrates an installation example of a solar panel on a vehicle.

FIG. 2 is a diagram that illustrates an installation example of a solar panel on a vehicle. A solar panel 11 is installed on the roof of a vehicle. The installation place of the solar panel 11 is a place that is on a surface parallel to the road surface, at which it is easy to capture sunlight. It may be placed on the hood or the trunk other than the roof. Also, since power can be generated on a surface that is not parallel to the road surface, it may be placed on a door panel, a door panel window, a back door glass or the like.

Vehicles that may have the solar panel 11 installed include vehicles having electric motors for driving power, such as a hybrid vehicle, a plug-in hybrid vehicle, an electric vehicle, and a fuel cell vehicle. However, since power generated by the solar panel 11 can be supplied to any electrical components (those that operate on a battery in general), it may be installed on a gasoline vehicle or a diesel vehicle.

Figure 3:
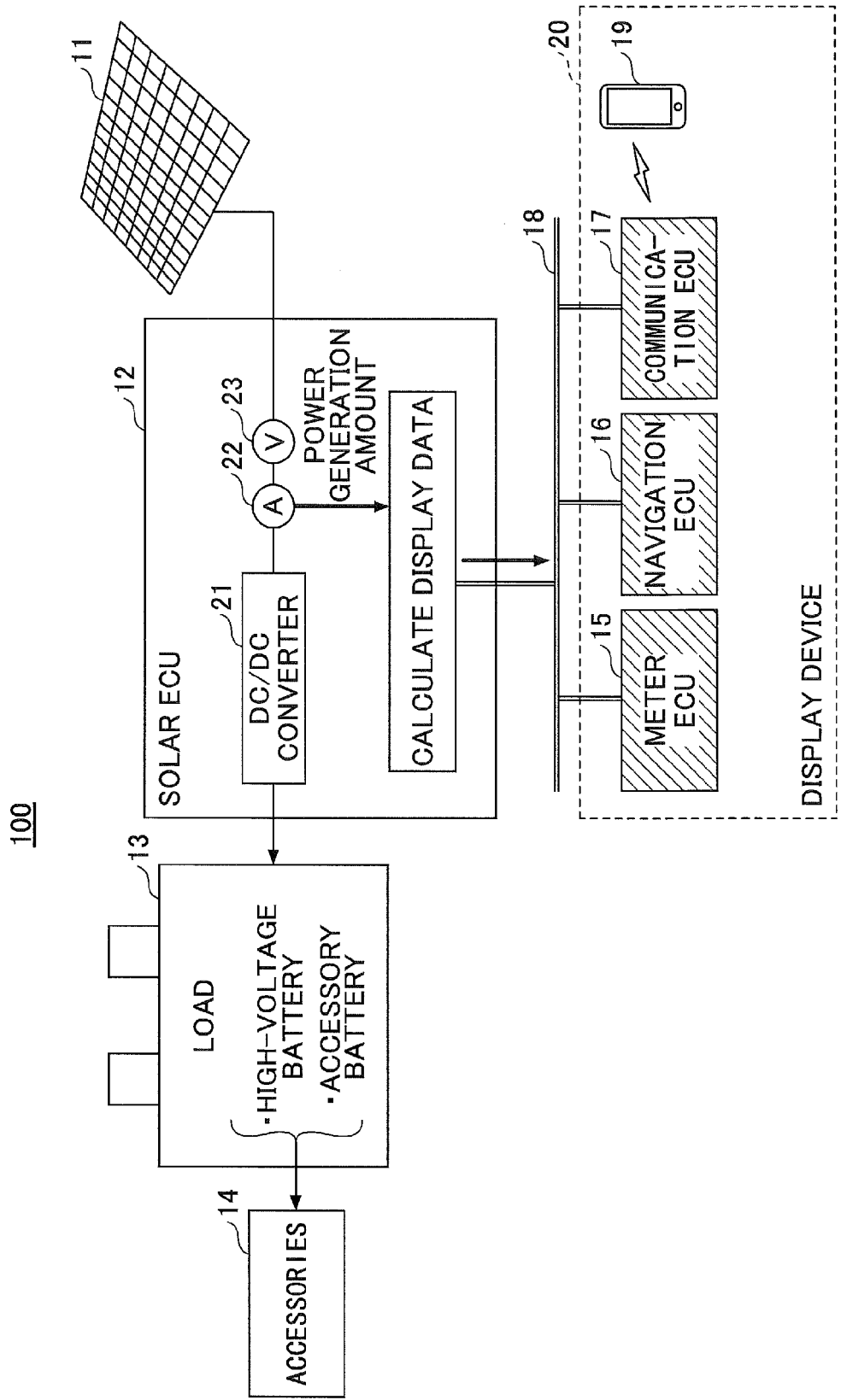
FIG. 3 is an example of a configuration diagram of a solar power generation system.

FIG. 3 is an example of a configuration diagram of a solar power generation system 100. The power generation amount of the solar panel 11 is controlled by a solar ECU (Electronic Control Unit) 12. Power generated by the solar panel 11 is supplied to a load 13. The solar ECU 12 is connected with other ECUs via an in-vehicle network 18 to communicate with each other. The other ECUs include, for example, a meter ECU 15, a navigation ECU 16, and a communication ECU 17. These ECUs may not be distinguished from each other, and may be collectively referred to as display devices 20 below.

There are many types of the solar panel 11 due to differences of materials and the like. A solar panel 11 installed on a vehicle may be determined based on the cost, power generation efficiency, and service life, and does not need to be a specific solar panel 11. For example, it may be a monocrystal silicon solar battery, a polycrystal silicon solar battery, an amorphous silicon solar battery, a compound solar battery, an organic solar battery, etc.

The solar ECU 12 applies power conversion to power generated by the solar panel 11, and supplies the power to the load 13. The solar ECU 12 detects a power generation amount within a period after the solar panel 11 generates power until the power is supplied to the load 13, and transmits the power generation amount to the display device 20. A current (direct current) and a voltage generated by the solar panel 11 can be measured by a current sensor 22 and a voltage sensor 23, respectively, and the power generation amount is calculated from these two quantities.

The solar ECU 12 includes a DC/DC converter 21 to convert the voltage of generated power into a voltage appropriate for the load 13. For example, if the voltage of an accessory battery that drives accessories of a vehicle is 12 V, the power generation voltage is stepped down to 12 V. Also, to charge a high-voltage battery that drives an electric motor for driving a vehicle, it is boosted to the voltage of the high-voltage battery (for example, several hundred V). The power charged into the load 13 is supplied to various accessories (actuators, lights, air conditioners, power sources of microcomputers, etc.).

The display devices 20 display power generation amounts, respectively. The meter ECU 15 displays power generation amounts by numerical values and graphs on an LCD of a meter panel or on a HUD (Head Up Display). The navigation ECU 16 similarly displays power generation amounts by numerical values and graphs on a display used for displaying a road map. The communication ECU 17 constitutes the display devices 20, and communicates with a device of a communication partner. The communication method of the communication ECU 17 may be changed depending on a device of a communication partner.

For example, a device of a communication partner may be a smart phone 19, a tablet, a cellular phone, or a note PC of the passenger (may be a driver) sitting on the assistant driver's seat or a rear seat. The communication ECU 17 executes a communication by a near field communication protocol such as NFC (Near Field Communication), Trans-Ferjet, the ad hoc mode of the wireless LAN, or Bluetooth (trademark), to transmit a power generation amount in real time.

Also, for example, a device of a communication partner may be a service center of the vehicle. The communication ECU 17 accesses a base station of a cellular phone network or a wireless LAN, and communicates with the service center (server) that is connected with the Internet via the base station to transmit a power generation amount. Note that the communication ECU 17 transmits authentication information to the service center to log in. The passenger, who may be in or out of the vehicle, communicates with the service center (server) via the Internet by a smart phone or the like which he/she carries, logs in the server if necessary, and receives the power generation amount.

In any case, a particular application to display the power generation amount is installed on a smart phone or the like. The application is activated by a communication between the communication ECU and the smart phone, or by the passenger. Then, the application starts communicating with the communication ECU or the server (IP address or the like has been registered in the application). Thus, the smart phone can display a power generation amount in real time, or a power generation amount that has been accumulated in the past.

Figure 4:
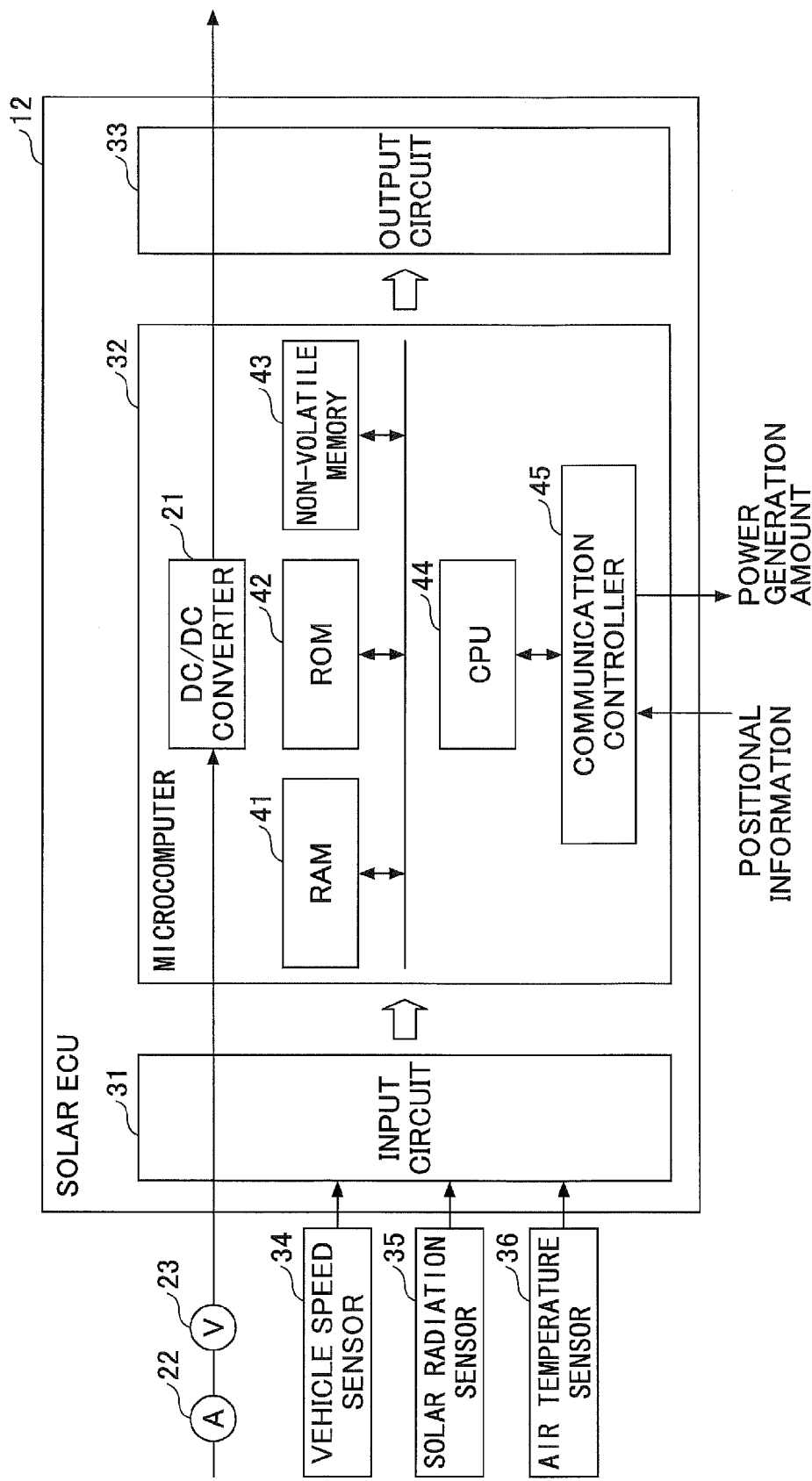
FIG. 4 is an example of a hardware configuration diagram of a solar ECU.

FIG. 4 is an example of a hardware configuration diagram of the solar ECU 12. The solar ECU 12 includes, as main elements, an input circuit 31, a microcomputer 32, and an output circuit 33. The microcomputer 32 includes a RAM 41, a ROM 42, a non-volatile memory 43, a CPU 44, and a communication controller 45 that are connected with each other via a bus. The CPU 44 executes an OS (Operating System) and programs stored in the ROM 42, to execute specific control for each of the ECUs. The RAM 41 is a work area for the CPU 44 to execute a program.

The non-volatile memory 43 is, for example, a flash memory in which data is not deleted when the power is turned OFF. The non-volatile memory 43 stores, for example, power generation amounts in the past. The communication controller 45 transmits and receives data with the other ECUs via the in-vehicle network 18 based on a communication protocol such as CAN (Controller Area Network), LIN (Local Interconnect Network), FlexRay, or Ethernet (trademark). Note that the communication controller 45 receives positional information that has been obtained by the navigation ECU 16 by using a GNSS (Global Navigation Satellite System) or the like, and transmits a calculated power generation amount.

The input circuit 31 is connected with a voltage sensor 23, a current sensor 22, a vehicle speed sensor 34, a solar radiation sensor 35, an air temperature sensor 36, and the like. The voltage sensor 23 detects a power generation voltage of the solar panel 11 (referred to as a "solar voltage value" below). The current sensor 22 detects a power generation current of the solar panel 11 (referred to as a "solar current value" below). Although the voltage sensor 23 and the current sensor 22 are in the ECU in FIG. 3, they may be disposed externally as in FIG. 4. In addition, it is possible to obtain signals of sensors connected with the other ECUs via the in-vehicle network 18. The vehicle speed sensor 34 is a sensor that detects the rotational speed of wheels. Note that the vehicle speed can be obtained by a change of the positional information calculated by the navigation ECU 16 or the like. The solar radiation sensor 35 detects strength of solar radiation, by converting a temperature, which has risen with solar radiation, into a voltage, or by converting light into a voltage by a photoelectric conversion element. The air temperature sensor 36 is a temperature sensor that detects external air temperature.

The input circuit 31 applies A/D conversion to these signals detected by the sensors if necessary, and inputs these signals into the microcomputer 32 with identification information of the sensors. The microcomputer 32 applies calculations on the signals detected by the sensors, and outputs them to the output circuit 33. The output circuit 33 is connected with the load 13, actuators, a motor drive circuit and the like, and the microcomputer 32 can control the actuators and the like.

[Functions of Solar ECU]

FIG. 5(a) is an example of a functional block diagram of the solar ECU 12. An operation reception unit 51 receives an operation of the passenger. The passenger operates the solar power generation system 100, for example, by touching a touch panel that is integrated with a display 57 of a navigation system, or by pressing down a hardware key. Operations include, for example, displaying a current power generation amount, displaying a past power generation amount, an accumulated value of past power generation amounts, and turning on/off a fluctuation reduction function. Note that a past power generation amount may be a power generation amount after parking has been started until the present time, a power generation amount after an IG-ON until the present time, a power generation amount for a predetermined time in the past, a power generation amount for an arbitrary period in the past, or the like.

The power generation amount calculation unit 52 multiplies a solar voltage value by a solar current value to calculate a current power generation amount (solar power generation amount). The calculation is periodically executed, or may be calculated at an arbitrary timing with an operation by the passenger. Also, the cycle does not need to be fixed, but may be changed to a shorter cycle during the daytime than a cycle at dusk or in the night. The power generation amount DB 53 stores past power generation amounts.

The display power generation amount calculation unit 54 calculates a display power generation amount that is to be displayed on the display device 20 based on the current power generation amount and the vehicle speed. There are cases where a fluctuation check process is applied to a power generation amount, and cases where a fluctuation check process is not applied. These cases are not distinguished when referring to a power generation amount transmitted from the solar ECU 12 to the display device 20, as a "display power generation amount".

FIG. 5(*b*) is an example of a diagram that schematically illustrates calculation by the display power generation amount calculation unit 54. The display power generation amount calculation unit 54 obtains a latest power generation amount (referred to as a "current power generation amount" or a "power generation amount (current value), below"). Then, it calculates a difference with a power generation amount that has been stored on the previous calculation cycle of the power generation amount (referred to as a "previous power generation amount" or a "power generation amount (previous value), below"). Namely, this is an amount of change. After having calculated the amount of change, the power generation amount (current value) is stored as the power generation amount (previous value).

The display power generation amount calculation unit 54 applies a fluctuation check process to the amount of change, and adds it with the power generation amount (previous value). This is a display power generation amount. The fluctuation check process is a process that makes the amount of change smaller when the vehicle speed is higher, and makes the amount of change greater when the vehicle speed is lower. The fluctuation check process will be described along with a vehicle speed/coefficient map, which comes next.

Figures 6, 7:
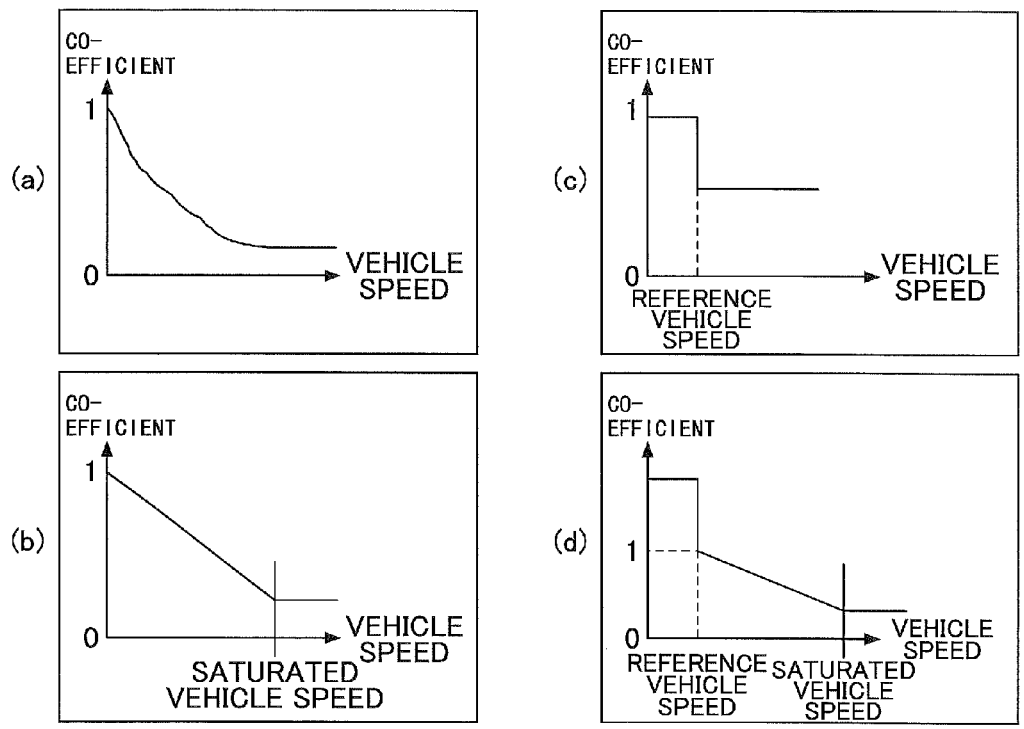
FIG. 6 is an example of a diagram that illustrates a vehicle speed/coefficient map.
FIG. 7 is an example of a diagram that schematically illustrates past power generation amounts stored in a power generation amount DB.

FIG. 6 is an example of a diagram that illustrates a vehicle speed/coefficient map. The fluctuation check process is, for example, a process that multiplies an amount of change by a coefficient depending on the vehicle speed. FIG. 6(*a*) is the same vehicle speed/coefficient map as in FIG. 1. The coefficient, which is "1" at the vehicle speed of zero, gets smaller inversely proportional to the vehicle speed. Since the coefficient gets steeply smaller when the vehicle speed starts getting higher, the amount of change can be suppressed in a region where the vehicle speed is low. Also, when the vehicle speed is sufficiently higher, the change of the coefficient (decreasing rate) is smaller, it is possible to prevent the power generation amount from not changing at all.

In FIG. 6(*b*) the coefficient, which is "1" at the vehicle speed of zero, gets uniformly smaller while the vehicle speed gets higher, and for a certain vehicle speed (saturated vehicle speed) or greater, the coefficient is constant. This makes it easy for the passenger to intuitively grasp a relationship between the vehicle speed and the variable quantity because the coefficient gets smaller proportionally to the vehicle speed. Also, by setting a lower limit of the coefficient, it is possible to prevent the power generation amount from not changing at all when the vehicle speed is high.

Note that in both FIGS. 6(*a*) and 6(*b*), coefficients may be set to zero in a region where the vehicle speed is high (for example, greater than or equal to 100 to 180 km/h).

FIG. 6(*c*) illustrates an example of a speed/coefficient map for executing the fluctuation check process only when it is greater than or equal to a reference vehicle speed. The reference vehicle speed is a typical vehicle speed when looking for a parking place, for example, a slowed-down vehicle speed (for example, 10 to 20 km/h). Since the coefficient is "1" when less than the reference vehicle speed, the power generation amount is displayed as it is. Therefore, the passenger can grasp the power generation amount at the parking place of the current location in real time. Since the coefficient is less than "1" (for example, 0.3 to 0.7) for the reference vehicle speed or higher, a power generation amount having the amount of change suppressed is displayed even if the power generation amount fluctuates. Therefore, the passenger can grasp the power generation amount stably even if the power generation amount fluctuates. For the reference vehicle speed or higher, the coefficient may be set gradually smaller while the vehicle speed gets higher.

FIG. 6(*d*) illustrates an example of a speed/coefficient map for emphasizing the amount of change when less than the reference vehicle speed. In FIGS. 6(*a*) to (*c*), the fluctuation check process is applied within a range not exceeding the original amount of change. On the other hand, by using the vehicle speed/coefficient map in FIG. 6(*d*), it is possible to make the amount of change of the power generation amount greater than the original amount of change. By making the amount of change of the power generation amount greater than the original amount of change, it is easier for the passenger to grasp a change of the power generation amount that depends on a difference between parking positions when looking for a parking lot based on the power generation amount. Although the coefficient is set to change similarly to FIG. 6(*b*) for the reference vehicle speed or higher, it may be set to change as in FIG. 6(*a*).

[Functions of Display Device]

Referring to FIG. 5 again, the display device 20 includes a display unit 56 to generate a display screen of the display power generation amount, a display 57 to display the display screen of the display power generation amount, and a lamp 58. The display unit 56 displays, for example, the display power generation amount on the display 57 in a time series. The display unit 56 stores a predetermined number of display power generation amounts in the past. When receiving a new display power generation amount, it generates a display screen for a predetermined number of display power generation amounts including the new display power generation amount. A display power generation amount is represented by, for example, a bar length in a bar graph or a plotting point in a line graph, and the display unit 56 generates a bar graph or a line graph having the bar length that corresponds to the numerical value of the obtained display power generation amount. For example, if the display power generation amount is 10 W, it generates a bar having the length of 1 cm, or plots it at the height of 1 cm.

Also, the display unit 56 controls turning on and off the lamp 58. The display unit 56 turns on the lamp 58 when the power generation amount is greater than or equal to a threshold (for example, 10 W), and turns off the lamp 58 when the power generation amount is less than the threshold.

Also, it is possible for the display unit 56 not only to display the display power generation amount, but also to output it by sound. By using a voice synthesis device, the display device 20 may output the display power generation amount from the loudspeaker.

Note that although the solar ECU 12 executes the fluctuation check process in FIG. 5, it is possible to have the display device 20 execute the fluctuation check process. Namely, the display device 20 may be configured to include the display power generation amount calculation unit 54. In this case, the solar ECU 12 just transmits a current power generation amount to the display device 20. Also, one ECU may execute a process to apply the fluctuation check process to a power generation amount process, and a process to display the power generation amount.

Also, if the display device 20 is a smart phone 19 or the like, it may not be easy to obtain the signal of the vehicle speed sensor 34 directly (although it is possible to have the solar ECU 12 transmit the vehicle speed information to the smart phone 19). Therefore, the smart phone 19 detects the vehicle speed by using positional information of a GNSS installed in it. This makes it possible for the display power generation amount calculation unit of the smart phone 19 to calculate the display power generation amount depending on the vehicle speed.

[Data Example of Recorded Power Generation Amount]

FIG. 7 is an example of a diagram that schematically illustrates past power generation amounts stored in the power generation amount DB 53. For dates and times, corresponding positional information, solar radiation amounts, air temperatures, vehicle speeds, and power generation amounts are recorded. A display power generation amount is not necessarily accurate because it may have the fluctuation check process applied, but raw data can be recorded because the power generation amount stored in the power generation amount DB 53 is a value obtained before the fluctuation check process. Also, by recording the vehicle speed, the display power generation amount can be calculated again. There is a relationship that the greater the solar radiation amount is, the greater the power generation amount is. This can be used, for example, for confirming performance of the solar panel 11. Since it has been known that a higher air temperature reduces the power generation efficiency, precision can be improved when verifying whether the relationship between the solar radiation amount and the power generation amount is normal.

Also, by recording the positional information, a parking place (a parking space for a single vehicle) having a high power generation amount is recorded. Therefore, if a vehicle is parked in the same parking lot for the next time, it is possible to select the parking place having the high power generation amount in the past.

It may be difficult to record all power generation amounts in the past in the power generation amount DB 53 of a vehicle, the data may be recorded sparsely. Also, records exceeding a limit number may be transmitted to a server. If a vehicle manufacturer or a server provider collects the data, power generation amounts of various places are collected in the server. Therefore, the passenger can receive the power generation amount of an arbitrary parking place in an arbitrary parking lot, to select a parking place having a high power generation amount.

[Display Example]

FIG. 8(a) is a diagram that illustrates an example of display power generation amounts that are displayed as a bar graph. Every time obtaining a new display power generation amount, the display unit 56 updates the bar graph to generate a display screen, and to display it on the display 57. Note that it is preferable to have the display unit 56 change the color of the bar of the newest display power generation amount from the colors of the past bars. This makes it easier to visually recognize the newest display power generation amount. Also, the color of the bar of the newest display power generation amount may be changed if the current display power generation amount is greater or smaller than the previous display power generation amount. This makes it easier for the passenger to grasp the power generation amount is tending upward or downward.

Also, it is preferable to have the display unit 56 display at least the newest display power generation amount by a numerical value. The passenger can grasp the power generation amount by the numerical value. Also, the display power generation amounts may be displayed by a list of numerical values instead of the bar graph.

Also, the display power generation amounts may not be displayed by such discontinuous bars, but the display power generation amounts may be displayed by a continuous line graph as illustrated in FIG. 8(b). The display power generation amount at the right end is the newest power generation amount. In this case, it is also preferable to display the newest display power generation amount by a numerical value.

FIG. 8(c) is a diagram that illustrates a display example of an accumulated power generation amount. The display unit 56 calculates an accumulated power generation amount by accumulating past power generation amounts. The accumulated power generation amount may be displayed by a power generation amount before having the fluctuation check process applied, or may be displayed by a power generation amount after having the fluctuation check process applied. An accumulated value may not fluctuate much for the power generation amount before having the fluctuation check process applied, and the passenger can grasp a comparatively stable accumulated value. Also, with an accumulated value of the display power generation amounts, the passenger can grasp a more stable accumulated value. The passenger can select which one is to be displayed.

FIG. 8(d) is a diagram that schematically illustrates a remaining capacity of a battery. The vehicle has power generation mechanisms of a power generator (motor generator), a regeneration brake, and the solar panel 11 installed. The power generation amounts, consumption amounts, and accumulation amounts of the respective power generation mechanisms are monitored, and how much the battery is charged by the power generation mechanisms has been obtained. Also in the case of the solar panel 11, the power generation amount of the solar panel 11 is used to charge accessories (high-voltage battery or accessory battery) 13. When the passenger has the remaining capacity of the battery displayed, the accumulation amount by the solar panel 11 is displayed as illustrated in the figure. The accumulation amount may be displayed by the power generation amount before having the fluctuation check process applied, or may be displayed by the power generation amount after having the fluctuation check process applied.

FIG. 8(e) is an example of a diagram that illustrates turning on and off the lamp 58. The lamp 58 switches between on and off based on whether the power generation amount exceeds a threshold. Therefore, by controlling turning on and off by the power generation amount having the fluctuation check process applied, frequent switching can be suppressed.

[Operational Steps]

Figure 9:
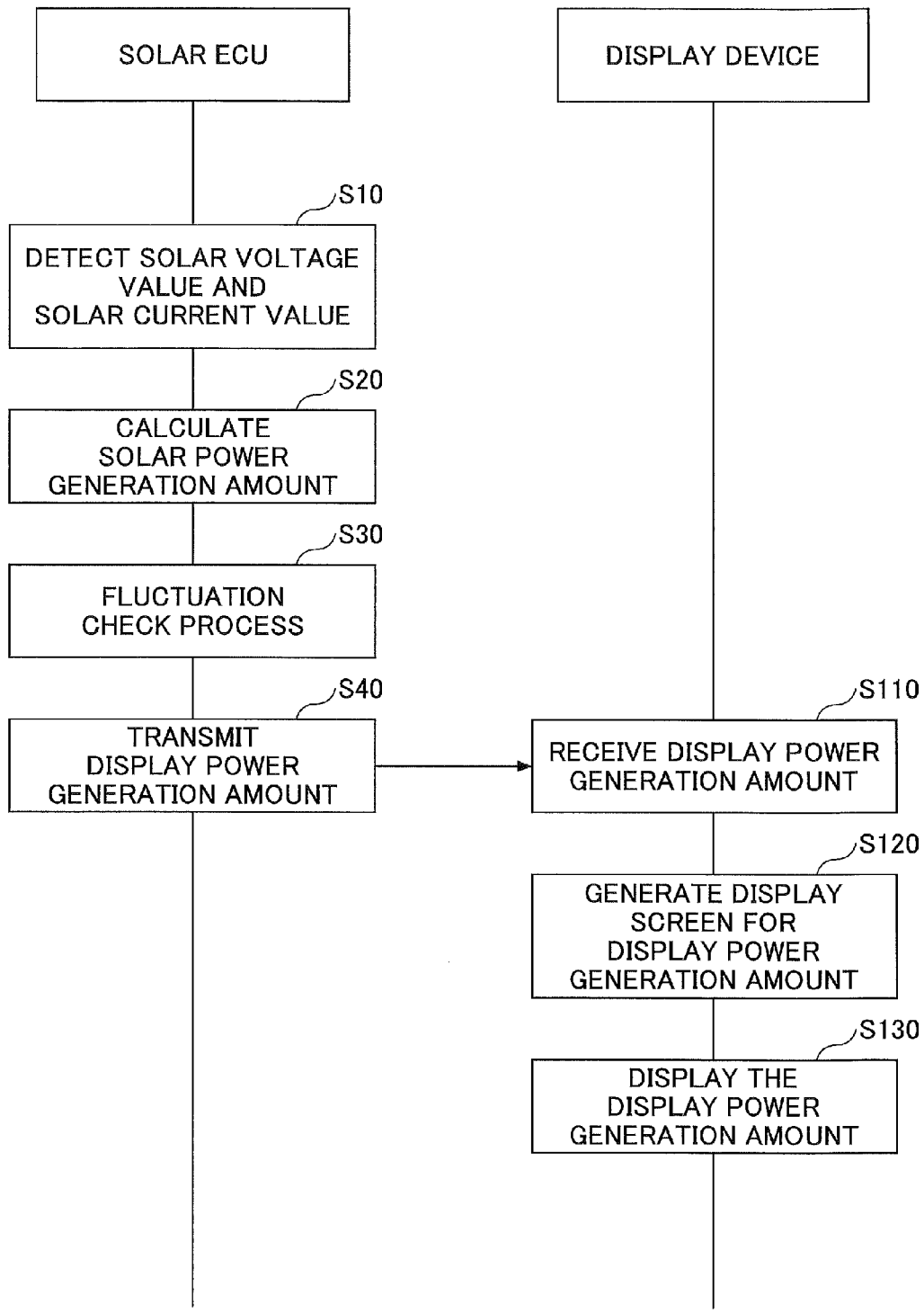
FIG. 9 is an example of a flowchart that illustrates operational steps of a solar power generation system.

FIG. 9 is an example of a flowchart that illustrates operational steps of the solar power generation system 100. The power generation amount calculation unit 52 detects a solar voltage value and a solar current value (S10). Next, the power generation amount calculation unit 52 calculates a power generation amount from the solar voltage value and the solar current value (S20). The display power generation amount calculation unit 54 executes a fluctuation check process based on the vehicle speed, and calculates the display power generation amount (S30). The solar ECU 12 transmits the display power generation amount to the display device 20 (S40).

The display device 20 receives the display power generation amount (S110). The display unit 56 generates a display screen of the display power generation amount (S120). The display unit 56 displays the display power generation amount (S130). The solar power generation system 100 repeats the process in FIG. 9 for every cycle to calculate the power generation amount.

As described above, since the solar power generation system 100 in the present embodiment applies a fluctuation check process to a power generation amount depending on the vehicle speed, fluctuation of the displayed power generation amount can be suppressed while traveling, and fluctuation of the displayed power generation amount may not be suppressed at a low speed when looking for a parking place. Therefore, it is easier for the passenger to grasp the current power generation amount while moving at a high vehicle speed, and to precisely identify a parking lot having a great power generation amount when looking for a parking lot having a great power generation amount while moving at a low vehicle speed, by recognizing the current power generation amount.

[Other Examples of Fluctuation Check Process]

The fluctuation check process just needs to be capable of suppressing the amount of change of the power generation amount, and may adopt the following methods other than the method using the coefficient described above.

(1) Rate Limitation

Figure 10:
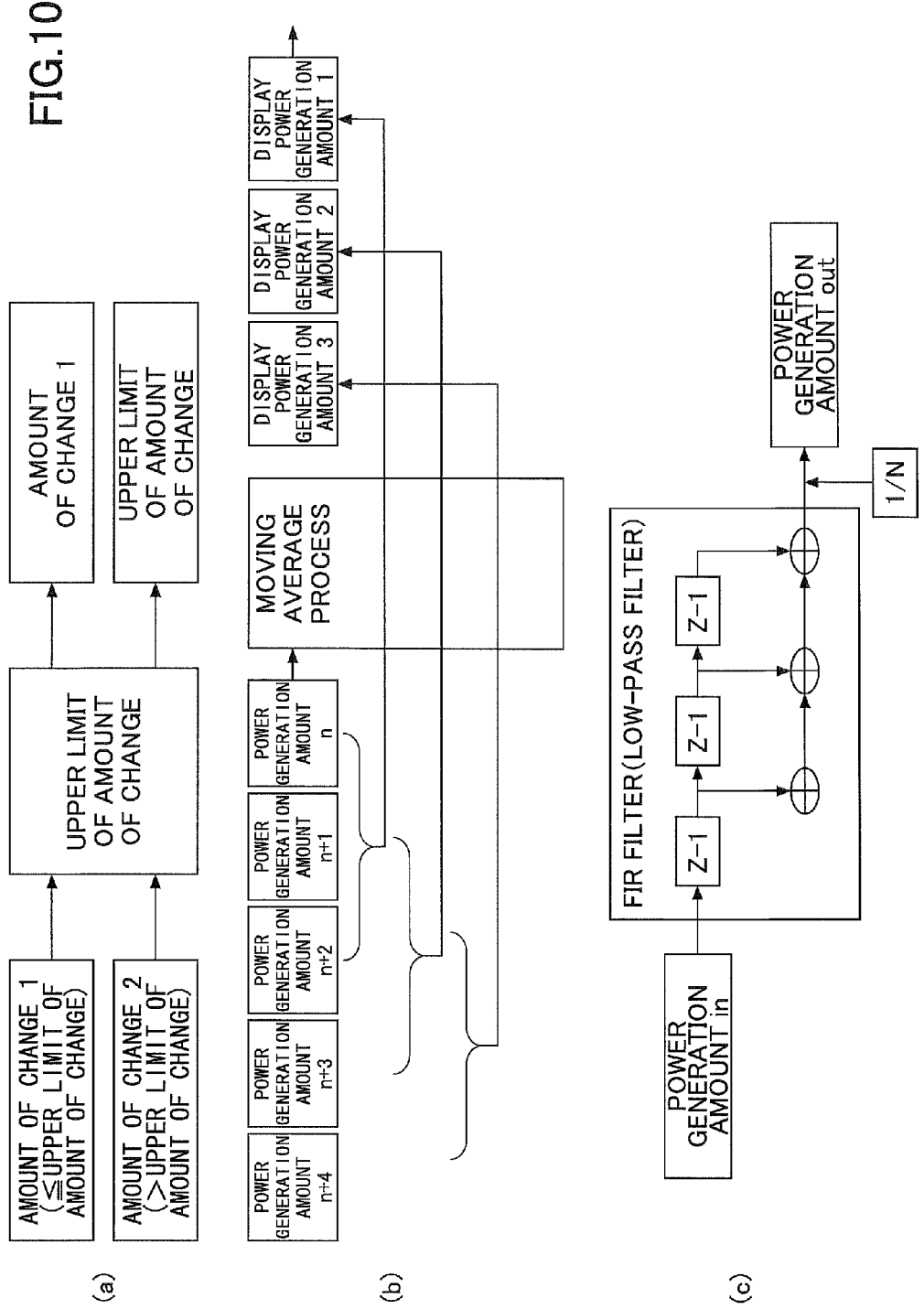

FIG. 10(a) is an example of a diagram that schematically illustrates a rate limitation. The rate limitation means setting an upper limit of the amount of change. The display power generation amount calculation unit 54 has an upper limit of the amount of change that has been set in advance. The display power generation amount calculation unit 54 compares the upper limit of the amount of change and an amount of change, and limits the amount of change to be less than or equal to the upper limit value.

For example, for an amount of change 1 less than or equal to the upper limit of the amount of change, the amount of change 1 is used as the amount of change as is. For an amount of change 2 greater than the upper limit of the amount of change, the upper limit of the amount of change is used as the amount of change. The display power generation amount calculation unit 54 adds the amount of change having the rate limitation applied with the power generation amount (previous value), to calculate the display power generation amount.

The upper limit of the amount of change of the rate limitation is less when the vehicle speed is lower, and greater when the vehicle speed is higher, similarly to coefficient/vehicle speed map in FIGS. 7(a) and (b). Namely, if the vehicle speed is low, the amount of change is displayed as is, or if the vehicle speed is high, the amount of change is suppressed to be displayed. Also, the upper limit of the amount of change of the rate limitation may be changed at the reference vehicle speed as a boundary as illustrated in FIG. 7(c).

Therefore, by the rate limitation, the amount of change can be suppressed when the vehicle speed is high, and the amount of change can be less suppressed when the vehicle speed is low, to display the power generation amount.

(2) Moving Average Process

FIG. 10(b) is an example of a diagram that schematically illustrates a moving average process. The moving average process is to calculate an average of a predetermined number of power generation amounts. For example, when calculating an average of three power generation amounts as the moving average, the display power generation amount calculation unit 54 calculates the average of three latest power generation amounts, to calculate the display power generation amount. For example, if a power generation amount n+2 is the latest power generation amount, the average of three amounts of the power generation amount n+2, a power generation amount n+1, and a power generation amount n is taken as the display power generation amount 1. Similarly, when the next power generation amount n+3 is calculated, the average of three amounts of the power generation amount n+3, the power generation amount n+2, and the power generation amount n+1 is taken as the display power generation amount 2. When the next power generation amount n+4 is calculated, the average of three amounts of the power generation amount n+4, the power generation amount n+3, and the power generation amount n+2 is taken as the display power generation amount 3. In this way, by taking the moving average, the amount of change of the display power generation amount can be suppressed.

The parameter of the power generation amount used for the moving average process is less when the vehicle speed is lower, and greater when the vehicle speed is higher. Namely, when the vehicle speed is lower, the average of a lesser number of power generation amounts is displayed, and when the vehicle speed is higher, the average of a greater number of power generation amounts is displayed. Also, the parameter may be changed at the reference vehicle speed as a boundary.

Therefore, by the moving average process, the amount of change can be suppressed when the vehicle speed is higher, and the amount of change can be less suppressed when the vehicle speed is lower, to display the power generation amount.

(3) Low-Pass Filter

FIG. 10(c) is an example of a diagram that schematically illustrates a low-pass filter. The figure shows a three-stage FIR filter that has a characteristic of a low-pass filter. Z-1 is a delay block to hold a power generation amount having been sampled in the past. In such a FIR filter, the filter characteristic is biased toward the low frequency side when the number of delay blocks is greater (by cutting off high frequency components). Therefore, by setting the number of delay blocks to be less when the vehicle speed is lower, and greater when the vehicle speed is higher, the amount of change can be suppressed when the vehicle speed is higher, and the amount of change can be less suppressed when the vehicle speed is lower, to display the power generation amount. Also, the process by the low-pass filter may also be executed at the reference vehicle speed or greater as in FIG. 7(c).

[Second Embodiment]

In the present embodiment, a solar power generation system 100 will be described that reduces the fluctuation by lengthening the display cycle.

Figure 11:
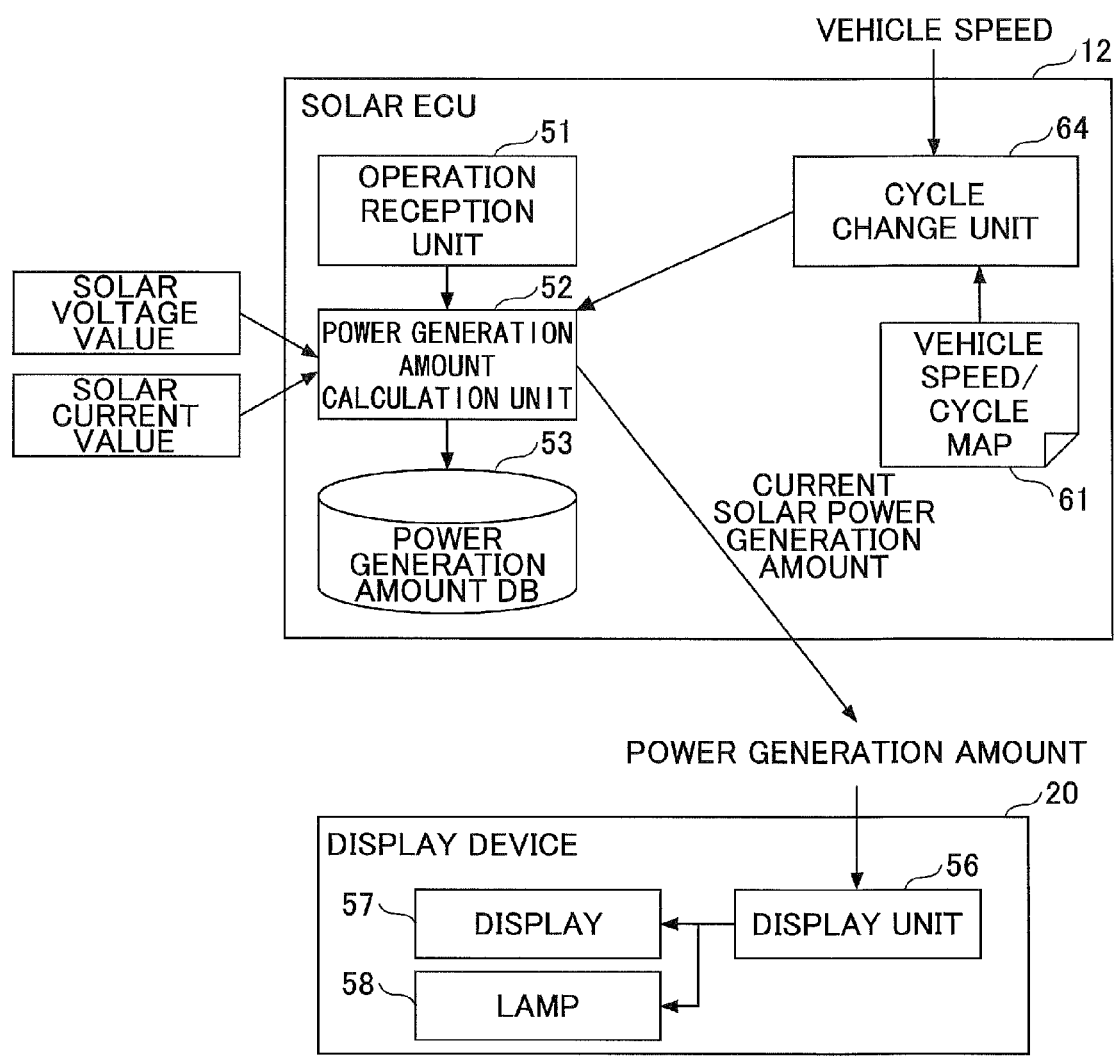
FIG. 11 is an example of a functional block diagram of a solar ECU (second embodiment)

FIG. 11 is an example of a functional block diagram of a solar ECU 12 in the present embodiment. In the present embodiment, the solar ECU 12 includes a cycle change unit 62. The cycle change unit 62 changes the display cycle of the power generation amount. Specifically, the power generation amount calculation unit 52 changes the cycle to calculate the power generation amount. Alternatively, among power generation amounts calculated for cycles, the power generation amount calculation unit 52 may choose some of the power generation amounts are chosen when outputting them to the display device 20, to reduce the update frequency of the displayed power generation amount.

In a vehicle speed/cycle map 61, display cycles are registered having associated with the vehicle speed. To suppress fluctuation of the power generation amount, a longer display cycle is associated with a higher vehicle speed. Even if actual power generation amounts fluctuate due to shades and the like, the passenger can grasp stable power generation amounts because the cycle to update the power generation amount is long.

Also, comparing with the first embodiment, the present embodiment does not need to apply the fluctuation check process to the power generation amount, and just needs to set the display cycle longer, and hence, the process load can be reduced. Also, the cost increase can be suppressed compared to adding the fluctuation check process to the solar ECU 12. Also, in the first embodiment, if the vehicle speed is high, a displayed power generation amount takes a non-precise value having the amount of change suppressed, whereas in the present embodiment, a calculated power generation amount can be displayed as is.

Figure 12:
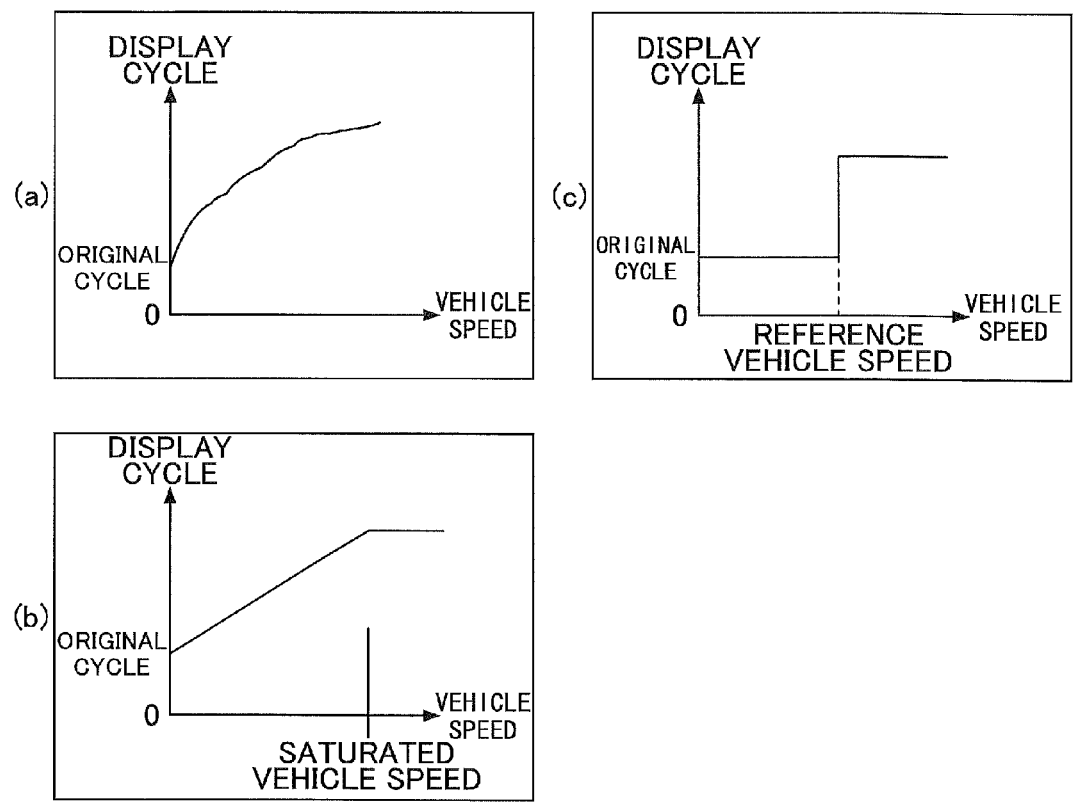
FIG. 12 is an example of a diagram that illustrates a vehicle speed/cycle map.

FIG. 12(*a*) is an example of a diagram that illustrates the vehicle speed/cycle map 61. The display cycle at the vehicle speed of zero is referred to as the "original cycle". The original cycle is a cycle for the solar ECU 12 to calculate the power generation amount in a state where the cycle is not adjusted. It can also be expressed as a conventional cycle. The original cycle is a cycle for the solar ECU 12 to execute a process for managing the solar panel, and set in advance, for example, to several ms to several dozen ms. The display cycles in the vehicle speed/cycle map 61 in FIG. 12(*a*) are set gradually longer from the original cycle at the vehicle speed of zero while the vehicle speed becomes higher. When the vehicle speed starts getting higher, the display cycle is steeply longer, and hence, it is easier to suppress the amount of change when changing from a region where the vehicle speed is low. Also, since the display cycle changes less when the vehicle speed is sufficiently higher, it is possible to prevent the power generation amount from not changing at all. The maximum display cycle is about 1 s to several s.

FIG. 12(*b*) illustrates a vehicle speed/coefficient map that is substantially the same as that in FIG. 12(*a*), but the display cycle uniformly gets greater (by a constant slope with respect to the vehicle speed). It is easy for the passenger to intuitively grasp a relationship between the vehicle speed and the display cycle because the display cycle becomes longer proportionally to the vehicle speed. Also, the display cycle is constant for a certain vehicle speed (saturated vehicle speed) or greater. Also, by setting the lower limit of the display cycle, it is possible to prevent the power generation amount from not changing at all when the vehicle speed moves fast.

FIG. 12(*c*) is an example of a diagram that illustrates the vehicle speed/cycle map 61 for changing the display cycle only for the reference vehicle speed or greater. The reference vehicle speed is the same as in the first embodiment. At the reference vehicle speed or lower, the power generation amount is displayed as is because the display cycle is the original cycle. The display cycle for the reference vehicle speed or higher is longer than the original cycle. Therefore, when the power generation amount changes, a power generation amount having a reduced amount of change is displayed. Therefore, the passenger can grasp stable power generation amounts when the power generation amounts change.

Figure 13:
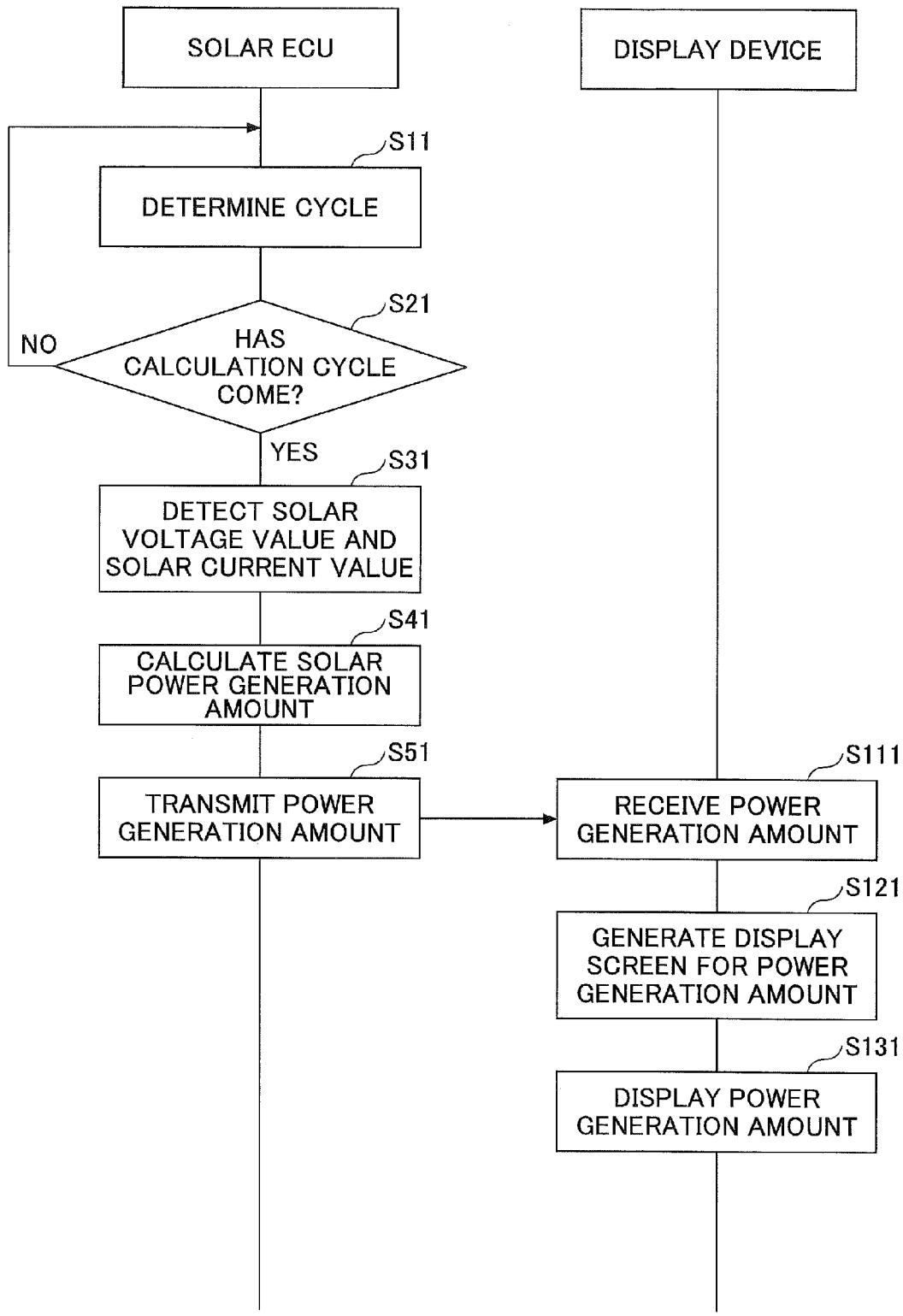
FIG. 13 is an example of a flowchart that illustrates operational steps of a solar power generation system (second embodiment)

FIG. 13 is an example of a flowchart that illustrates operational steps of the solar power generation system 100 in the present embodiment. Although this process changes the calculation cycle of the power generation amount, the process may change the output cycle to the display device 20.

Based on the vehicle speed, the cycle change unit 62 determines the display cycle (S11). The cycle change unit 62 determines whether a display cycle has come (S21). The cycle change unit 62 waits for a coming display cycle. While waiting, the cycle change unit 62 does nothing with a solar voltage value and a solar current value even if they are detected.

If a display cycle has come (YES at S21), the cycle change unit 62 makes a request for calculation to the power generation amount calculation unit 52. This makes the power generation amount calculation unit 52 detect a solar voltage value and a solar current value (S31).

Next, the power generation amount calculation unit 52 calculates a power generation amount from the solar voltage value and the solar current value (S41). In the present embodiment, the power generation amount is taken as the displayed power generation amount as is.

The solar ECU 12 transmits the power generation amount to the display device 20 (S51). The rest of the process is the same as in the first embodiment.

The display device 20 receives the power generation amount (S111). The display unit 56 generates a display screen of the power generation amount (S121). The display unit 56 displays the power generation amount (S131).

As described above, in addition to the same effects as in the first embodiment, the solar power generation system 100 in the present embodiment can suppress the amount of change of the displayed power generation amount at a lower cost, and can display the power generation amount before having the process applied.

[Third Embodiment]

In the present embodiment, a solar power generation system 100 will be described that executes either the fluctuation check process in the first embodiment, or changing the display cycle in the second embodiment, when the position of a vehicle is located at a specific place.

Figure 14:
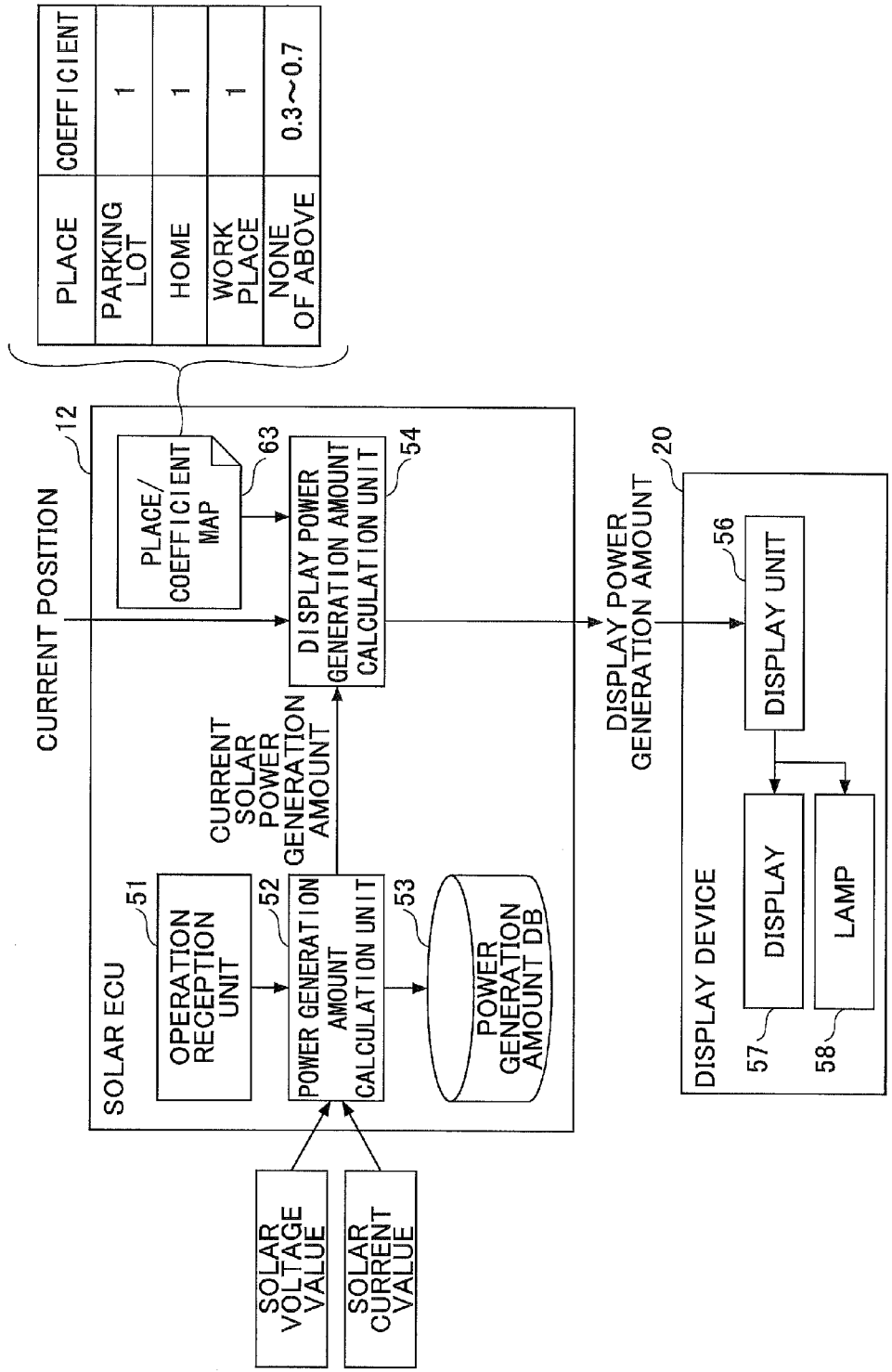
FIG. 14 is an example of a functional block diagram of a solar ECU (third embodiment)

FIG. 14 is an example of a functional block diagram of a solar ECU 12 in the present embodiment. The solar ECU 12 includes a place/coefficient map 63 in the present embodiment. The place/coefficient map 63 is a map that includes places having coefficients associated. The place is a place at which the vehicle is parked principally. Therefore, parking lots for parking the vehicle at a visiting place, a home, a workplace, and the like are registered. The coefficients for these places may be "1" or a numerical value close to "1". The coefficients for places other than the above are evenly set to, for example, 0.3 to 0.7.

Therefore, when looking for a parking place, the displayed power generation amount tends to fluctuate, which makes it easier to look for parking information having a greater charge amount. Also, at a place other than where the vehicle is parked principally, the amount of change having been suppressed is displayed, and the passenger can grasp stable power generation amounts.

Note that the display power generation amount calculation unit 54 makes a query about the current position to the navigation ECU 16, and obtains the current position from the navigation ECU 16. This current position includes facility information on a road map that is identified with coordinates. If the coefficient of the current position registered in the place/coefficient map 63 is less than 1, the display power generation amount calculation unit 54 reads out the coefficient having been associated with the current position, and executes the fluctuation check process. Also, when changing the display cycle, if the cycle of the current position registered in the place/coefficient map 63 is greater than the original cycle, the cycle change unit 62 changes the display cycle.

Figure 15:
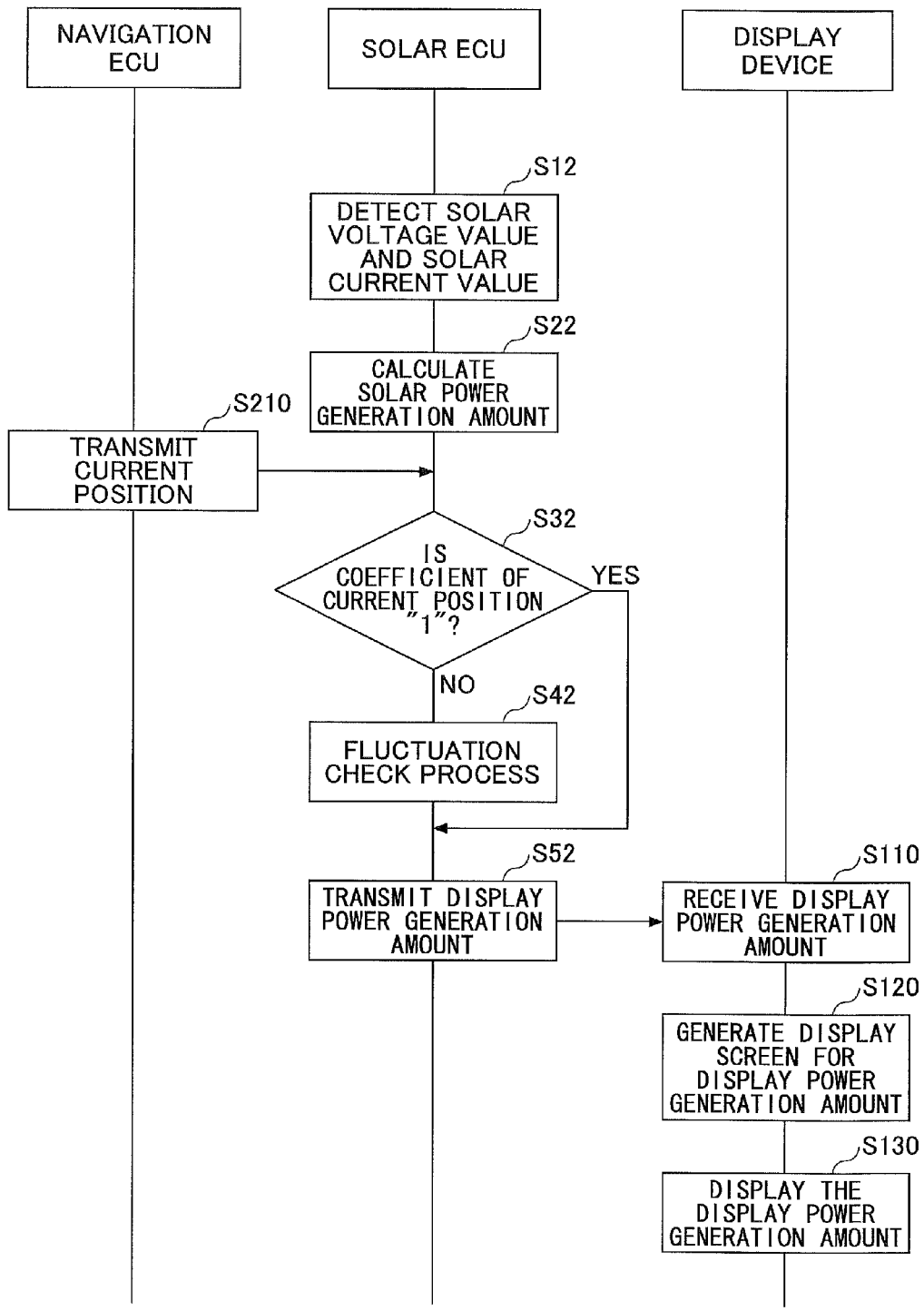
FIG. 15 is an example of a flowchart that illustrates operational steps of a solar power generation system (third embodiment)

FIG. 15 is an example of a flowchart that illustrates operational steps of the solar power generation system 100. The power generation amount calculation unit 52 detects a solar voltage value and a solar current value (S12). Next, the power generation amount calculation unit 52 calculates a power generation amount from the solar voltage value and the solar current value (S22).

The display power generation amount calculation unit 54 obtains the current position from the navigation ECU 16 (S210).

The display power generation amount calculation unit 54 determines whether the coefficient of the current position registered in the place/coefficient map 63 is "1" (S32).

If the coefficient of the current position registered in the place/coefficient map 63 is not "1" (NO at S32), the display power generation amount calculation unit 54 executes the fluctuation check process, and calculates the display power generation amount (S42).

On the other hand, if the coefficient of the current position registered in the place/coefficient map 63 is "1" (YES at S32), the display power generation amount calculation unit 54 does not execute the fluctuation check process.

The solar ECU 12 transmits the power generation amount to the display device 20, which has or has not had the fluctuation check process applied (S52).

The display device 20 receives the display power generation amount (S110). The display unit 56 generates a display screen of the display power generation amount (S120). The display unit 56 displays the display power generation amount (S130). Note that the solar ECU 12 may execute a change process of the display cycle as in the second embodiment.

As described above, the solar power generation system 100 in the present embodiment can execute either the fluctuation check process, or the display cycle change process at a place where an influence of shades should be monitored.

[Fourth Embodiment]

In the present embodiment, a solar power generation system 100 will be described that executes either the fluctuation check process in the first embodiment, or changing the display cycle in the second embodiment, based on a traveling state.

Figure 16:
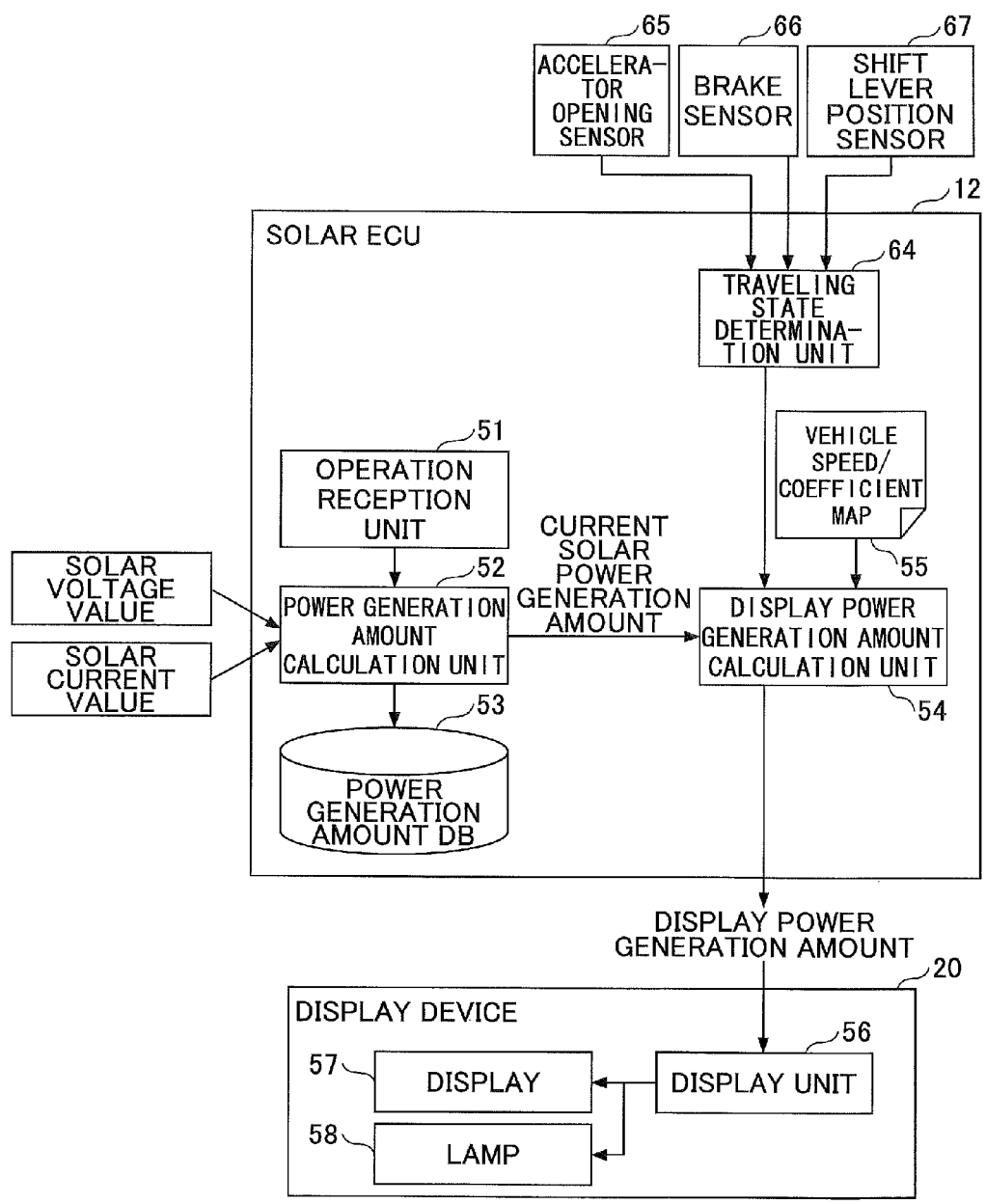
FIG. 16 is an example of a functional block diagram of a solar ECU (fourth embodiment)

FIG. 16 is an example of a functional block diagram of a solar ECU 12 in the present embodiment. The solar ECU 12 includes a traveling state determination unit 64 in the present embodiment. The traveling state determination unit mainly determines whether the vehicle is traveling at a low speed, or whether the vehicle is stopping or parking. Based on signals of an accelerator opening sensor 65, a brake sensor 66, a shift position sensor 67 that are installed in the vehicle, the traveling state determination unit 64 determines a travel state, for example, as follows.

Operational position of the shift lever: D range
Accelerator pedal operation: off
Brake pedal operation: off Since the shift lever is at D range, the accelerator pedal is not operated, and the brake pedal is not operated, it is estimated that the vehicle is traveling at a low speed by creep, or traveling by inertia. If traveling by inertia, the accelerator pedal will be operated on within a comparatively short time, and it can be excluded from traveling at a low speed. Therefore, if the above conditions are satisfied for a predetermined time, it can be determined that the vehicle is traveling at a low speed.

Operational position of the shift lever: R range
Accelerator pedal operation: on
Brake pedal operation: off When the shift lever is at R range, it is rare that the vehicle travels at a high speed, and hence, it can be estimated that the vehicle is traveling at a low speed.

Operational position of the shift lever: P range
Accelerator pedal operation: off
Brake pedal operation: off Since the shift lever is at P range, it can be estimated that the vehicle is parked or stopped, and if the vehicle starts traveling after that, it can be estimated that the vehicle is traveling in a parking lot. In this way, the travel state can be determined by user operations.

If determining that the vehicle state corresponds to traveling at a low speed, the traveling state determination unit 64 indicates it to the display power generation amount calculation unit 54. The display power generation amount calculation unit 54 applies the fluctuation check process to the power generation amount to calculate the display power generation amount. Alternatively, the cycle change unit 62 changes the display cycle as in the second embodiment.

Since the specific vehicle speed is not identified in the present embodiment, it is difficult to change the coefficient or the display cycle depending on the vehicle speed as in FIGS. 6(*a*)-(*b*) or FIGS. 12(*a*)-(*b*). However, as in FIG. 6(*c*), it is possible to apply the fluctuation check process at the reference vehicle speed or higher, or to lengthen the display cycle at the reference vehicle speed or higher.

Figure 17:
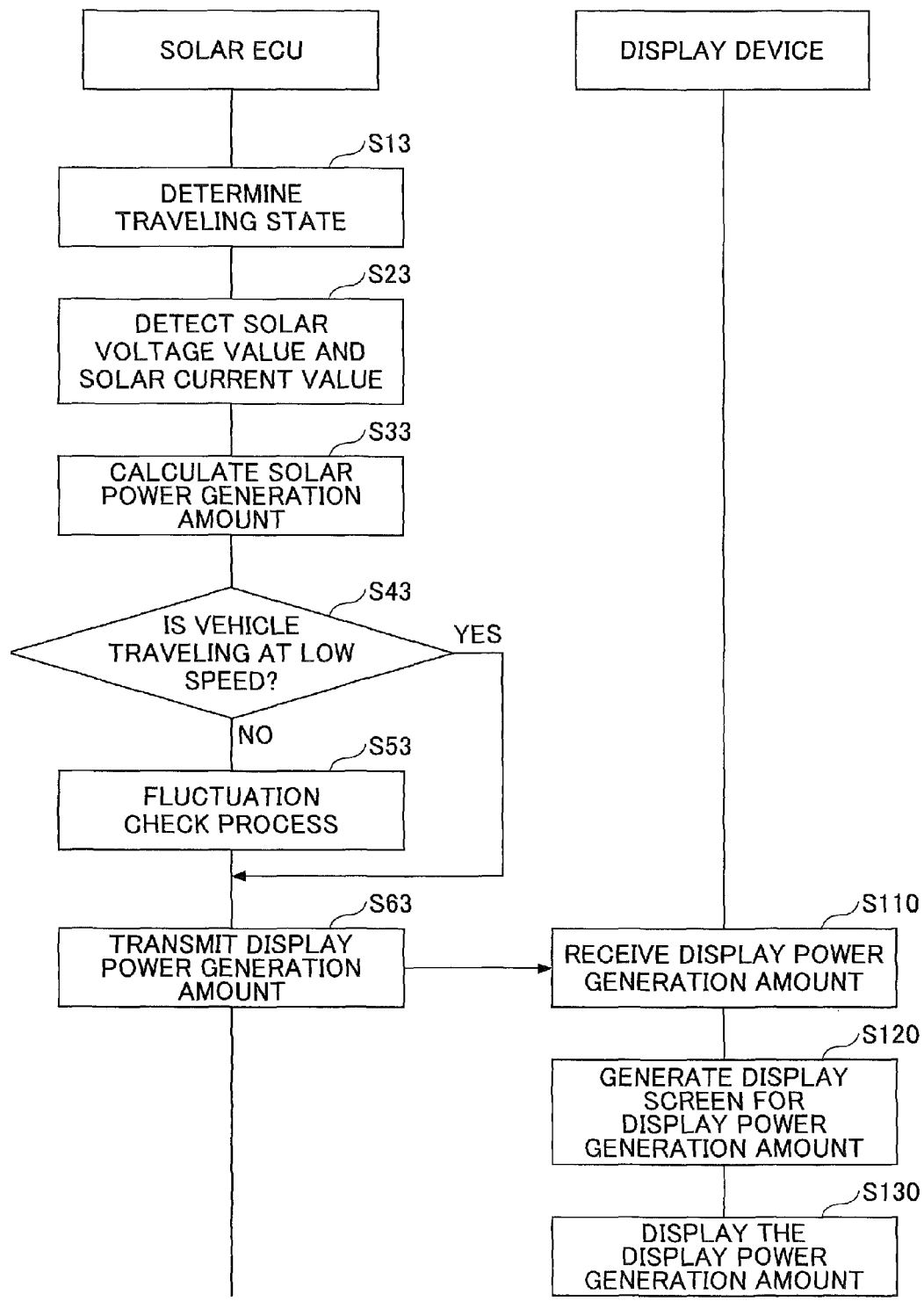
FIG. 17 is an example of a flowchart that illustrates operational steps of a solar power generation system (fourth embodiment).

FIG. 17 is an example of a flowchart that illustrates operational steps of the solar power generation system 100.

The traveling state determination unit 64 determines a travel state, based on an operational position of the shift lever, an accelerator pedal operation, and a brake pedal operation (S13).

The power generation amount calculation unit 52 detects a solar voltage value and a solar current value (S23). Next, the power generation amount calculation unit 52 calculates a power generation amount from the solar voltage value and the solar current value (S33).

The display power generation amount calculation unit 54 determines whether it is in a travel state of traveling at a low speed (S43).

If traveling at a low speed (YES at S43), the display power generation amount calculation unit 54 does not execute the fluctuation check process.

If not traveling at a low speed (NO at S43), the display power generation amount calculation unit 54 executes the fluctuation check process based on the vehicle speed, to calculate the display power generation amount (S53).

The solar ECU 12 transmits the display power generation amount to the display device 20 (S63).

The display device 20 receives the display power generation amount (S110). The display unit 56 generates a display screen of the display power generation amount (S120). The display unit 56 displays the display power generation amount (S130). The solar power generation system 100 periodically repeats the process in FIG. 9.

As described above, the solar power generation system 100 in the present embodiment can determine a travel state from operational members for the passenger without using the vehicle speed information, and can execute either the fluctuation check process, or the display cycle change process, in a travel state where an influence of shades should be monitored.

The embodiments have been described in detail. Further, the present invention is not limited to these embodiments, but various variations and modifications may be made without departing from the scope of the present invention. Also, all or multiple elements in the above embodiments may be combined.

Note that the present application is based on and claims the benefit of priority of Japanese Priority Application No. 2013-095948 filed on Apr. 30, 2013, with the Japanese Patent Office, the entire contents of which are hereby incorporated by reference.

DESCRIPTION OF REFERENCE SYMBOLS 11 solar panel
12 solar ECU
13 load
19 smart phone
20 display device
22 current sensor
23 voltage sensor
52 power generation amount calculation unit
54 display power generation amount calculation unit
62 cycle change unit
100 solar power generation system

The invention claimed is:

1. A power generation amount output device, configured to output a power generation amount of a photovoltaic panel to a display unit, the photovoltaic panel being installed in a vehicle, wherein said power generation amount output device comprises:
   a power generation amount obtainment unit configured to obtain the power generation amount of the photovoltaic panel;
   a fluctuation reduction unit configured to reduce a fluctuation of the power generation amount to be output by the display unit, depending on a vehicle state of the vehicle; and
   a power generation amount output unit configured to output the power generation amount having the fluctuation reduced by the fluctuation reduction unit to the display unit.

2. The power generation amount output device, as claimed in claim 1, wherein the fluctuation reduction unit applies a fluctuation check process to the power generation amount obtained by the power generation amount obtainment unit, to suppress the fluctuation of the power generation amount,
   wherein the power generation amount output unit outputs the power generation amount having the fluctuation check process applied by the fluctuation reduction unit to the display unit.

3. The power generation amount output device, as claimed in claim 1, wherein the fluctuation reduction unit reduces the fluctuation of the power generation amount to be output by the display unit, by lengthening a cycle to obtain the power generation amount by the power generation amount obtainment unit, or by lengthening a cycle to output the power generation amount obtained by the power generation amount obtainment unit to the display unit.

4. The power generation amount output device, as claimed in claim 1, wherein the fluctuation reduction unit obtains vehicle speed information of the vehicle as the vehicle state, to reduce the fluctuation of the power generation amount to be output by the display unit more when the vehicle speed is higher.

5. The power generation amount output device, as claimed in claim 1, wherein the fluctuation reduction unit obtains vehicle speed information of the vehicle as the vehicle state, and if the vehicle speed is greater than or equal to a reference value, reduces the fluctuation of the power generation amount to be output by the display unit.

6. The power generation amount output device, as claimed in claim 1, wherein the fluctuation reduction unit obtains positional information of the vehicle as the vehicle state, and if a current position of the vehicle indicates that the vehicle is traveling in a place other than predetermined places, reduces the fluctuation of the power generation amount to be output by the display unit.

7. The power generation amount output device, as claimed in claim 1, further comprising:
   a travel state determination unit configured to determine a travel state of the vehicle from operational information of an operational member operated by a driver,
   wherein if it is not determined by the travel state determination unit that it is the travel state where the vehicle is traveling at the vehicle speed less than or equal to a predetermined value, the fluctuation reduction unit reduces the fluctuation of the power generation amount to be output by the display unit.

8. A photovoltaic system, including
   a photovoltaic panel,
   a display unit, and
   a power generation amount output device configured to output a power generation amount of the photovoltaic panel,
   said power generation amount output device comprising:
   a power generation amount obtainment unit configured to obtain the power generation amount of the photovoltaic panel;
   a fluctuation reduction unit configured to reduce a fluctuation of the power generation amount to be output by the display unit, depending on a vehicle state of a vehicle; and
   a power generation amount output unit configured to output the power generation amount having the fluctuation reduced by the fluctuation reduction unit to the display unit.

9. A power generation amount output device comprising:
   a first display unit;
   a power generation amount output unit configured to output a power generation amount of a photovoltaic panel to the first display unit, said photovoltaic panel being installed in a vehicle,
   a power generation amount obtainment unit configured to obtain the power generation amount of the photovoltaic panel;
   a fluctuation reduction unit configured to reduce a fluctuation of the power generation amount to be output by the display unit, depending on a vehicle state of a vehicle; and
   a power generation amount display unit configured to have the first display unit display the power generation amount having the fluctuation reduced by the fluctuation reduction unit.

* * * * *